US009338439B2

United States Patent
Grossmann et al.

(10) Patent No.: US 9,338,439 B2
(45) Date of Patent: May 10, 2016

(54) SYSTEMS, METHODS, AND COMPUTER PROGRAM PRODUCTS FOR RUNTIME ADJUSTMENT OF IMAGE WARPING PARAMETERS IN A MULTI-CAMERA SYSTEM

(71) Applicants: Etienne G. Grossmann, Redwood City, CA (US); Gaile Gordon, Palo Alto, CA (US); John I. Woodfill, Palo Alto, CA (US)

(72) Inventors: Etienne G. Grossmann, Redwood City, CA (US); Gaile Gordon, Palo Alto, CA (US); John I. Woodfill, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 13/995,861

(22) PCT Filed: Mar. 29, 2013

(86) PCT No.: PCT/US2013/034560
§ 371 (c)(1),
(2) Date: Jun. 19, 2013

(87) PCT Pub. No.: WO2013/151883
PCT Pub. Date: Oct. 10, 2013

(65) Prior Publication Data
US 2014/0125771 A1 May 8, 2014

Related U.S. Application Data

(60) Provisional application No. 61/619,094, filed on Apr. 2, 2012.

(51) Int. Cl.
*G06T 5/00* (2006.01)
*G06T 7/00* (2006.01)
*H04N 13/02* (2006.01)

(52) U.S. Cl.
CPC ............ *H04N 13/0246* (2013.01); *G06T 5/006* (2013.01); *G06T 7/002* (2013.01); *G06T 2207/10012* (2013.01); *G06T 2207/10021* (2013.01)

(58) Field of Classification Search
USPC .............................. 382/103, 154; 348/46, 42
See application file for complete search history.

(56) References Cited

U.S. PATENT DOCUMENTS

| 6,215,898 B1 * | 4/2001 | Woodfill et al. ............... 382/154 |
| 2003/0156751 A1 * | 8/2003 | Lee et al. ...................... 382/154 |

(Continued)

FOREIGN PATENT DOCUMENTS

WO 2010029040 A2 3/2010

OTHER PUBLICATIONS

International Search Report and Written Opinion received for International Application No. PCT/US2013/034560, maild Jul. 24, 2013, 10 pages.

(Continued)

*Primary Examiner* — Jayanti K Patel
*Assistant Examiner* — Reza Aghevli
(74) *Attorney, Agent, or Firm* — Green, Howard & Mughal LLP

(57) ABSTRACT

Methods, systems, and computer program products for determining, without interrupting a video processing pipeline, whether currently used warping parameters are appropriate for a multi-camera system. New warping parameters may be determined, where these parameters cause the images rectified with these new parameters to have the desired geometric properties. This determination may be made without interrupting the video processing pipeline. Warping parameters may be determined, for example, such that the epipolar lines of the two cameras are horizontal and properly aligned, as defined below, and the metric 3D position of a point observed by both cameras can be determined and is accurate.

18 Claims, 19 Drawing Sheets

(56) References Cited

U.S. PATENT DOCUMENTS

| | | | |
|---|---|---|---|
| 2003/0197779 A1* | 10/2003 | Zhang et al. | 348/14.16 |
| 2003/0218672 A1* | 11/2003 | Zhang et al. | 348/14.16 |
| 2005/0237385 A1* | 10/2005 | Kosaka et al. | 348/42 |
| 2005/0271264 A1* | 12/2005 | Ito et al. | 382/154 |
| 2006/0294569 A1 | 12/2006 | Chung | |
| 2007/0041659 A1 | 2/2007 | Nobori et al. | |
| 2010/0020178 A1 | 1/2010 | Kleihorst | |
| 2010/0239165 A1* | 9/2010 | Wu et al. | 382/176 |
| 2010/0329543 A1* | 12/2010 | Li et al. | 382/154 |
| 2011/0044531 A1* | 2/2011 | Zhang et al. | 382/154 |
| 2011/0080466 A1* | 4/2011 | Kask et al. | 348/43 |
| 2011/0157373 A1 | 6/2011 | Xiangyun et al. | |
| 2011/0293142 A1* | 12/2011 | van der Mark et al. | 382/103 |
| 2011/0310255 A1 | 12/2011 | Medeiros et al. | |
| 2012/0007954 A1* | 1/2012 | Miller et al. | 348/46 |
| 2012/0039525 A1* | 2/2012 | Tian et al. | 382/154 |

OTHER PUBLICATIONS

International Preliminary Report on Patentability mailed Oct. 16, 2014, for PCT Application No. PCT /US2013/034560.

Eureopean Search Report for EP Patent Application No. 13772206.2, issued on Dec. 16, 2015.

Hermans et al., "Extrinsic Recalibration in Camera Networks", IEEE 4th Canadian Conference on Computer and Robot Vision, May 1, 2007.

* cited by examiner

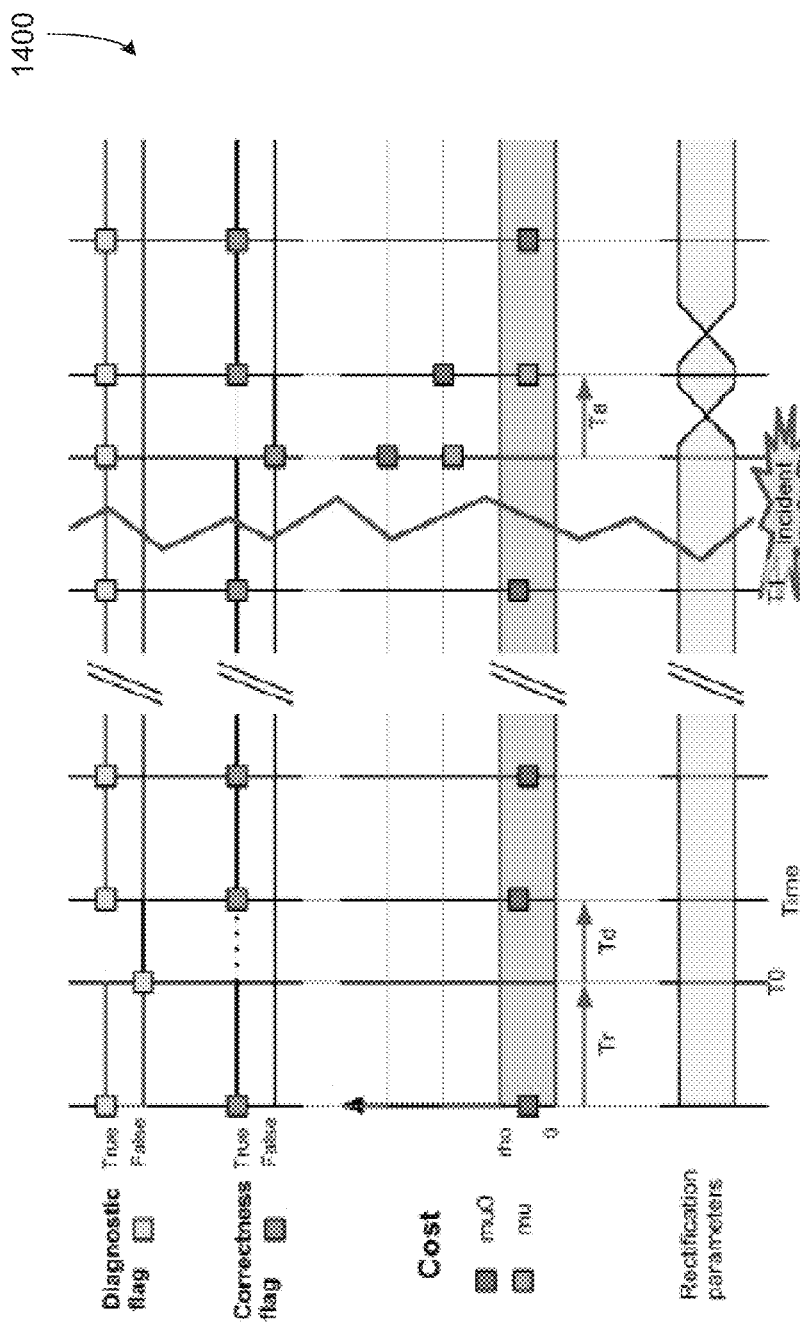

FIG. 14 Example times chart of the operation of the system that performs on-the-fly adjustment of warping parameters. The first two rows show the values of the Diagnostic and Correctness flags over time. The third row plots the value of mu0 (and possible mu), with the area of "small enough" values in green. The fourth row shows when changes in the warping parameters occurred.
At T0, the input images do not allow diagnosis of the warping parameters, so the Diagnostic flag is cleared. Between T1 and T1+Tr, an incident occurred that rendered the warping parameters inappropriate. At T1+Tr, a failure was diagnosed. The first adjustment did not reduce sufficiently, so the Correctness flag was cleared. At T1+Tr+Ta, the second adjustment brought low enough cost, so the Correctness flag was set.

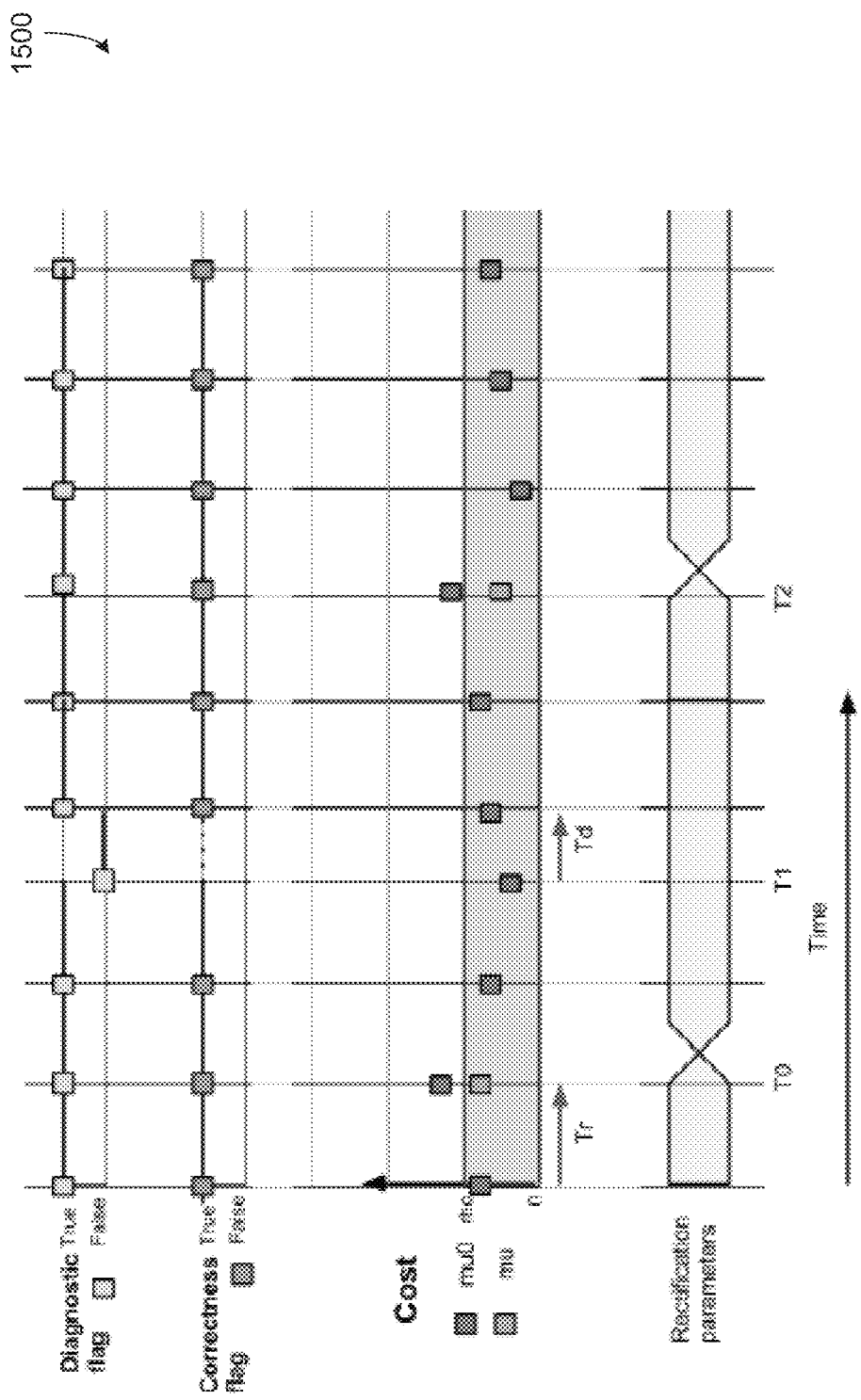
FIG. 15 Example time chart of the operation of a system that performs on-the-fly adjustment of warping parameters. At T0 and T2, the optical properties of a camera have drifted to the point that the warping parameters needed corrections. At T1, diagnostic was not possible.

SYSTEMS, METHODS, AND COMPUTER PROGRAM PRODUCTS FOR RUNTIME ADJUSTMENT OF IMAGE WARPING PARAMETERS IN A MULTI-CAMERA SYSTEM

TECHNICAL FIELD

The systems, methods, and computer program products described herein relate to image processing.

BACKGROUND

In many multi-camera video processing pipelines, the images produced by the imagers (raw images) are warped before being further processed in the pipeline. The warping is done so that the resulting images have useful geometric properties, such as being distortion-free, having square pixels, having aligned epipolar lines etc. These warped images may be referred to as "rectified images".

The warping parameters that allow these properties to hold depend on the configuration of the cameras including: optical properties of the individual cameras (e.g. focal length, principal point and distortion parameters) and/or on the relative positions of the cameras, and/or the positions of the cameras in the scene. The warping parameters may be typically computed prior to operating the multi-camera system, using a calibration process during which the cameras may be placed in one or more controlled environments, often viewing a known calibration target. The correct operation of a multi-camera system may be dependent on using appropriate warping parameters.

If the optical properties of a camera change or if the camera position relative to the other camera(s) change, then the warping parameters may have to be recomputed. Otherwise, the assumed optical properties of the warped images may not hold any longer and the functionality of the multi-camera system may be compromised. It may then be necessary to find new warping parameters that ensure the images rectified with these new parameters have the desired geometric properties. This may be done by running the calibration process again, which would require interrupting the operation of the multi-camera system and possibly manipulating the cameras physically. Interruptions like this are not desirable because they render the system less practical to use and cause increased operational costs.

Self-calibration of single- and multi-camera systems is sometimes possible. Self-calibration refers to the computation of some or all warping parameters in uncontrolled environments, e.g., without the use of a fixed calibration target. These methods are generally aimed at cameras which do not hold fixed warping parameters because they are designed with intentionally mobile optical elements, such as stereo cameras with variable vergence or cameras with zoom lenses. On these systems, self-calibration is generally performed constantly, at the cost of computational resources, frame rate and/or latency.

For a multi-camera system which is designed with fixed optical elements (e.g., lens and imagers that are held rigidly with respect to each other, lens focal lengths that are fixed, and rigid relative positioning between imaging units), the warping parameters are not expected to change dramatically during use. As a consequence, constantly performing self-calibration is not useful and would incur added cost in computational resource, frame rate, and/or latency. However, physical shock to the multi-camera system, or other environmental effects such as a large temperature change, could introduce changes to the system which would require some warping parameters to be recomputed.

BRIEF DESCRIPTION OF THE DRAWINGS/FIGURES

FIG. 14 is a timing diagram illustrating the operation of an embodiment of the system described herein.

FIG. 15 is a timing diagram illustrating the operation of an embodiment of the system described herein, where the optical system is subject to drift.

Figure 1:
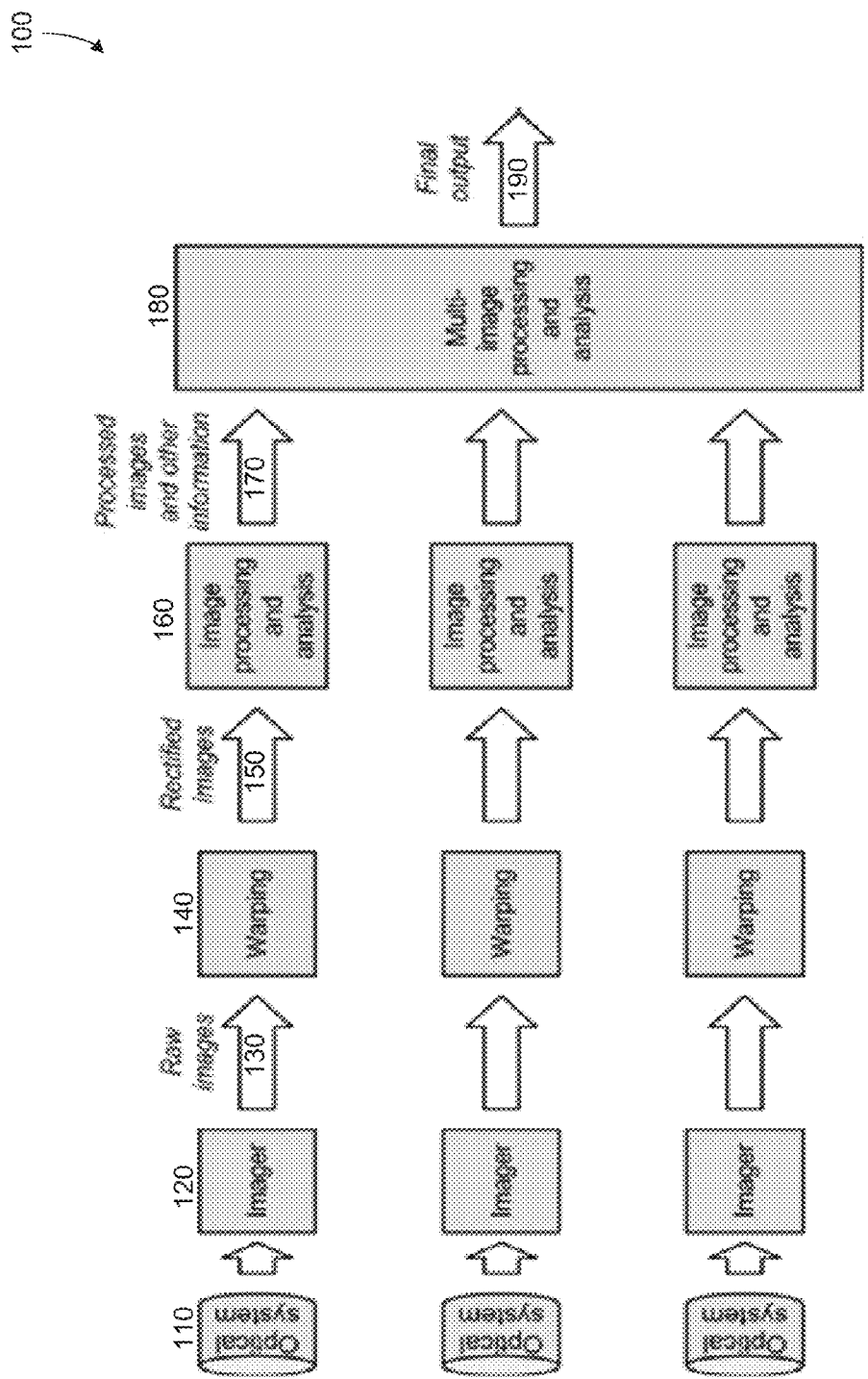
FIG. 1 is a block diagram of a multi-camera imaging system according to an embodiment

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the scope of the description. It will be apparent to a person skilled in the relevant art that this can also be employed in a variety of other systems and applications other than what is described herein.

Described herein are methods, systems, and computer program products to determine, without interrupting the video processing pipeline, whether currently used warping parameters are appropriate for a multi-camera system. New warping parameters may be determined, where these parameters cause the images rectified with these new parameters to have the desired geometric properties. This determination may be made without interrupting the video processing pipeline. Warping parameters may be determined, for example, such that the epipolar lines of the two cameras are horizontal and properly aligned, as defined below, and the metric 3D position of a point observed by both cameras can be determined and is accurate.

The described system and processing may operate in the context of video processing pipelines. FIG. 1 shows the diagram of such a system: the system may include, without limitation,

- one or more optical systems 110, such as lenses,
- imagers 120 that may digitize images formed by the lenses, resulting in raw images 130,
- a warping stage 140 (also called a rectifier) which may transform raw images 130 into rectified images 150,
- an optional image processing and analysis stage 160 during which the images may be further transformed and other information may be extracted, and
- a multi-image processing and analysis stage during which the processed images and other information 170 from all imagers 120 may be processed, yielding a final output 190.

This figure is for illustration only; the system and processing described herein may also apply to variants of the illustrated arrangement. One possible variant may be a system in which a single optical system is present, in which case the multi-image processing and analysis stage could be absent. Another possible variant may include an image processing stage interposed between the imager and warping stages. In another variant, additional information such as statistics or histograms could be communicated by the imager to the warping stage or from the warping to the image processing and analysis stage. It is also understood that multicamera or multi-optical systems will sometimes be referred to by the common term stereo cameras or stereo systems, which is not meant to limit embodiments to systems of exactly two imagers or cameras.

In the systems considered herein, the optical system and imager stages may be implemented by dedicated physical devices, such as lenses and complementary metal oxide semiconductor (CMOS) imagers. The other stages, however, may be implemented in any one of many possible ways, including software implementation on a general-purpose computing system, software implementation on specialized computers such as digital signal processors (DSPs) or graphics processors, implementation in a field programmable gate array (FPGA), in a specialized application specific integrated circuit (ASIC), or in any other information processing technology.

Raw Images

The raw images produced by an imager and lens subsystem (i.e., a camera) may suffer from various types of distortion. For example, images may suffer from geometric distortion and as a result the 2D projection of a 3D straight line may appear as a curve in the image, rather than a straight line. Also, the focal lengths and the principal point may not be known precisely.

Rectified Images

In image processing algorithms and in computer vision algorithms, the input image's known geometric properties may be required. For example, it is often assumed that the images are produced by an ideal perspective camera, where the projections of lines appear as lines. Moreover, the focal lengths and principal point are often assumed to be known. Also, in multi-camera systems, the relative positions of the cameras are often assumed to be known. In some cases, it is assumed that the image planes of the cameras are parallel. In some cases, as in stereo vision systems and in camera arrays, it is furthermore assumed that the image planes are parallel to a plane containing the centers of projections of the cameras. Images that have undergone a warping process may be known as rectified images; images that have these required geometric properties may be called properly rectified images.

Image Warping

In order to execute image processing algorithms or computer vision algorithms that require rectified images as input, it may be possible to warp a raw image into a rectified image. The warping operation may comprise computing an image that appears to have been produced by a camera that has all desired geometric properties required by the algorithm.

At each pixel of the output (rectified) image, the warping process may determine, based on the input raw image, the value the pixel would take if it had been produced by a camera that has all desired geometric properties required by the algorithm. For each pixel location in the rectified image, the corresponding location in the raw image may be determined (which may be real- rather than integer-valued); this raw image location may be sampled, possibly using numerical interpolation, resulting with a new image value; and the new image value may be written into the rectified image. The map from pixel locations in the raw image to pixel locations in the rectified image may be called "the warping." For practical reasons, the warping may often be defined by its inverse and the inverse warping may also be called "the warping".

A pixel location in the rectified image may be referred to as (i, j) and the corresponding location in the raw image as (i', j'). Examples of inverse maps used may include projective transformations of the form:

$$i' = (a_{11}i + a_{12}j + a_{13})/(a_{31}i + a_{32}j + a_{33}),$$

$$j' = (a_{21}i + a_{22}j + a_{23})/(a_{31}i + a_{32}j + a_{33}),$$

where, for m, n∈{1, 2, 3}, $a_{mn}$ are the coefficients that define the projective transformation. These coefficients may be called the parameters of the projective mapping (or warping). A 3-by-3 matrix A may be used to hold the coefficients $a_{mn}$.

Another Common Mapping May have the Form $$i' = P(i, j)$$

$$j' = Q(i, j)$$

where P( ) and Q( ) are functions of two variables. These functions may be polynomials, rational, or other functions. The parameters of this polynomial or rational warping (or mapping) are the coefficients of the polynomials. This type of mapping may be used, for example, to make 3D straight lines appear as curves in the raw image. Multiple (inverse) warpings may also be composed together—for example, a projective mapping, followed by a polynomial mapping, followed by a projective mapping.

Two particular mappings are sometimes used: the identity mapping, which copies its input to its output (thus (i', j')=(i, j)), and the subsampling mapping, where (i', j')=(ki+c, lj+r), for some integer numbers k, l, c, and r; in this latter mapping, pixels of the raw image are sampled every k-th column and every l-th row. The identity mapping may be used when the image processing system has a mode in which it can process raw images, for example for the purpose of determining appropriate warping parameters during calibration.

The symbol $\ominus$ will be used herein to represent warping parameters, whether they are polynomial coefficients, scaling factors or matrix coefficients. When multiple warping processes are present, for example for warping images produced by multiple cameras, these parameters may be distinguished by writing them $\ominus^1, \ominus^2, \ldots$. For brevity, the notation $\ominus=(\ominus^1, \ominus^2, \ldots)$ will be used herein to encapsulate all the warping parameters used in the image processing pipeline. When considering a running image processing pipeline, $\ominus_0$ will denote the warping parameters that are currently being used by its warping process, or $\ominus^1_0, \ominus^2_0, \ldots$ if multiple cameras are present. Points in the raw image will be written (i', j'), (u', v'), or (a', b'), where i', u', and a' are X-coordinates and j', v', and b' are Y-coordinates. Points in the rectified image will likewise be written (i, j), (u, v), or (a, b). The warping will be represented by a mathematical function written as f( ):(u', v')=f(u, v, $\ominus$) and its inverse $f^1$( ):(u, v)=$f^1$(u', v', $\ominus$).

Geometric or Optical Properties of Rectified Images

The following lists geometric or optical properties that may given, separately or in conjunction, to rectified images:

1. The camera behaves as a perspective projection, i.e., the image of a straight line in the world is a straight line in the image. For example, if the system uses a fish-eye lens, or a catadioptric imaging system, then the warping may be chosen to eliminate optical distortion.

2. The focal length and principal point are known. This allows determination of the azimuth and altitude of a pixel with respect to the optical axis. For example, in a photogrammetric system or a vision-guided robot, it may be necessary to know the 3D direction in which a pixel looks, relative to the camera itself.

3. The optical axis and the image coordinate axes are known in a coordinate system attached to another camera. In a stereo vision system, or a tri- or multiocular camera system, it may be preferable to know the relative pose of the two or more cameras.

4. In the stereo vision systems considered here, epipolar lines are parallel to image rows. Moreover, a 3D point projects to the same row in both images. This property may be used to simplify the search for correspondences between the images produced by the two cameras. When this is the case, the epipolar lines are horizontal and may be said to be properly aligned.

5. A metric stereo vision system may have Properties 2, 3 and 4. The conjunction of these properties may allow determination of the location in the world of a 3D point identified in the two images. A metric stereo vision system may be said to allow a Euclidean reconstruction.

These examples are for illustration purpose only and do not hart the applicability of the systems and methods disclosed in this document.

When an image processing pipeline is operating with warping parameters that ensure that the warped images have the required geometric properties, then we may say that the warping parameters are appropriate for the operation of the pipeline, or appropriate for the camera configuration.

Figure 2:
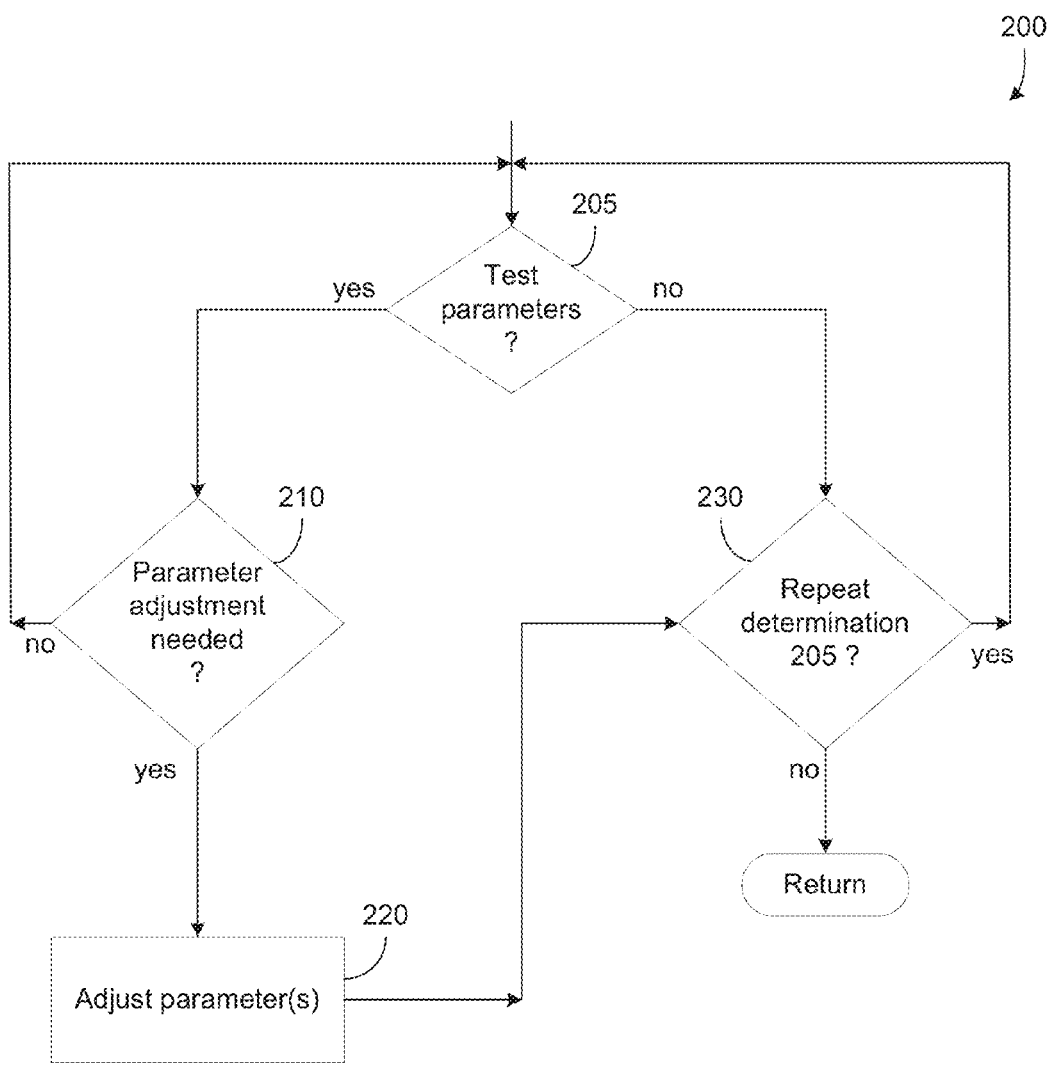
FIG. 2 is a flowchart illustrating processing of an embodiment.

The overall processing of the systems, methods, and computer program products described herein is illustrated in FIG. 2, according to an embodiment. At 205, a determination may be made as to whether the warping parameters are to be tested. If so, then at 210, the parameters may be tested to determine whether warping parameters need to be adjusted. If so, then at 220 adjustment of some or all of the warping parameters may be performed. At 230 a determination may be made as to whether to repeat the determination of 205. Moreover, if it was initially determined at 205 that the parameters are not to be tested, then processing may continue at 230. This decision 205 regarding whether to test the warping parameters may be repeated at regular intervals in an embodiment; alternatively or in addition, this determination may be made when certain conditions are met. It may be repeated at certain time intervals, and/or at the instigation of a human operator, and/or when a physical disruption to the camera system is detected, for example.

Determining Whether Adjustments are Needed

In a typical image processing pipeline, it is usually assumed that the used warping parameters are correct and remain unchanged for the duration of the operation of the pipeline. If, for example, the optical properties of the cameras change, and consequently the used warping parameters are not appropriate anymore, then the performance of the system will degrade. However, there may be no mechanism to detect such degradation, unless it is so great that it creates a massive failure of the image processing pipeline or of the systems that depend on the pipeline.

It may thus be useful to attempt detection of whether the images processed in the pipeline have the assumed geometric properties. A general system architecture is described here, where this architecture allows diagnosis of whether the required geometric properties have changed, i.e., whether the current warping parameters are appropriate or not. Some specific adjustment methods are also described below.

Figure 3A:
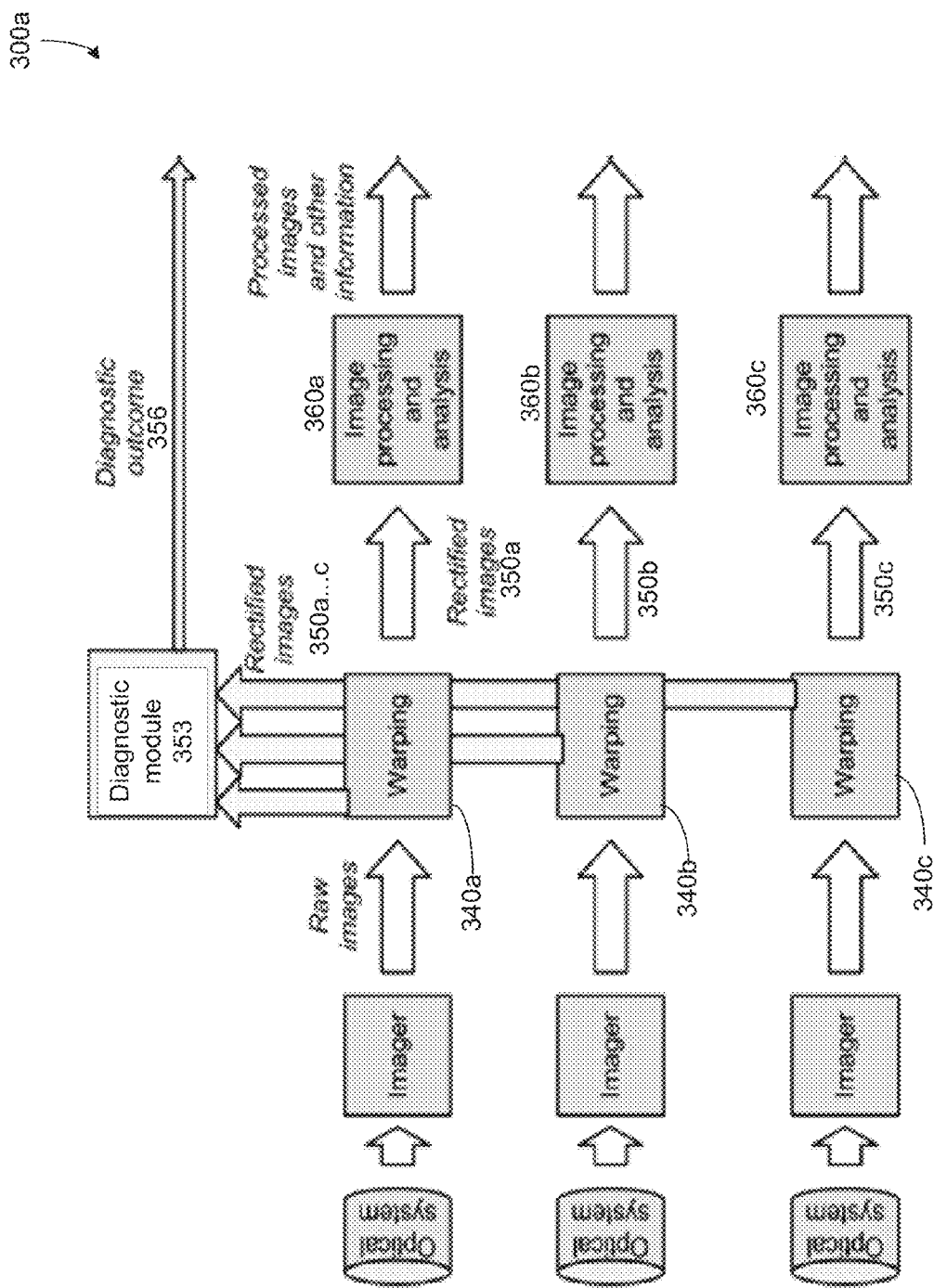
FIG. 3a is a block diagram of a multi-camera imaging system that includes a diagnostic module, according to an embodiment.

FIG. 3a illustrates a system that implements a diagnostic process, according to an embodiment. The diagnostic process may be added to an image processing pipeline such as that illustrated in FIG. 1. The diagnostic process may be executed by the same computing platform that executes other tasks on the pipeline, on a separate computing platform, or on dedicated electronic hardware. The diagnostic process may be run sporadically or continuously.

The system 300 of FIG. 3a may include several optical systems and connected imagers. Each such pair (an optical system and its connected imager) may collectively be termed an input imaging unit. System 300 may also include warping modules 340a through 340c that output their respective output rectified images 350a . . . 350c to a diagnostic module 353. Here, a determination may be made as to whether warping parameters need to be modified. The outcome of this diagnosis is shown as outcome 356.

The diagnostic process may therefore perform the following actions: the process may acquire one or more images; run one or more diagnostic processes on the acquired images; and store or communicate the outcome of the diagnostic algorithms.

In some cases, it may be possible to provide warping parameters that are specific to the diagnostic process to a warping module 340. Here, diagnostic parameters may be passed from the diagnostic module 353 to one or more of the warping modules 340. This may occur before performing the above process, after which the original warping parameters may be restored.

Some diagnostic processes may run on a single image, or on images produced by a single imager, so a separate process may be run on each imager subsystem.

Figure 3B:
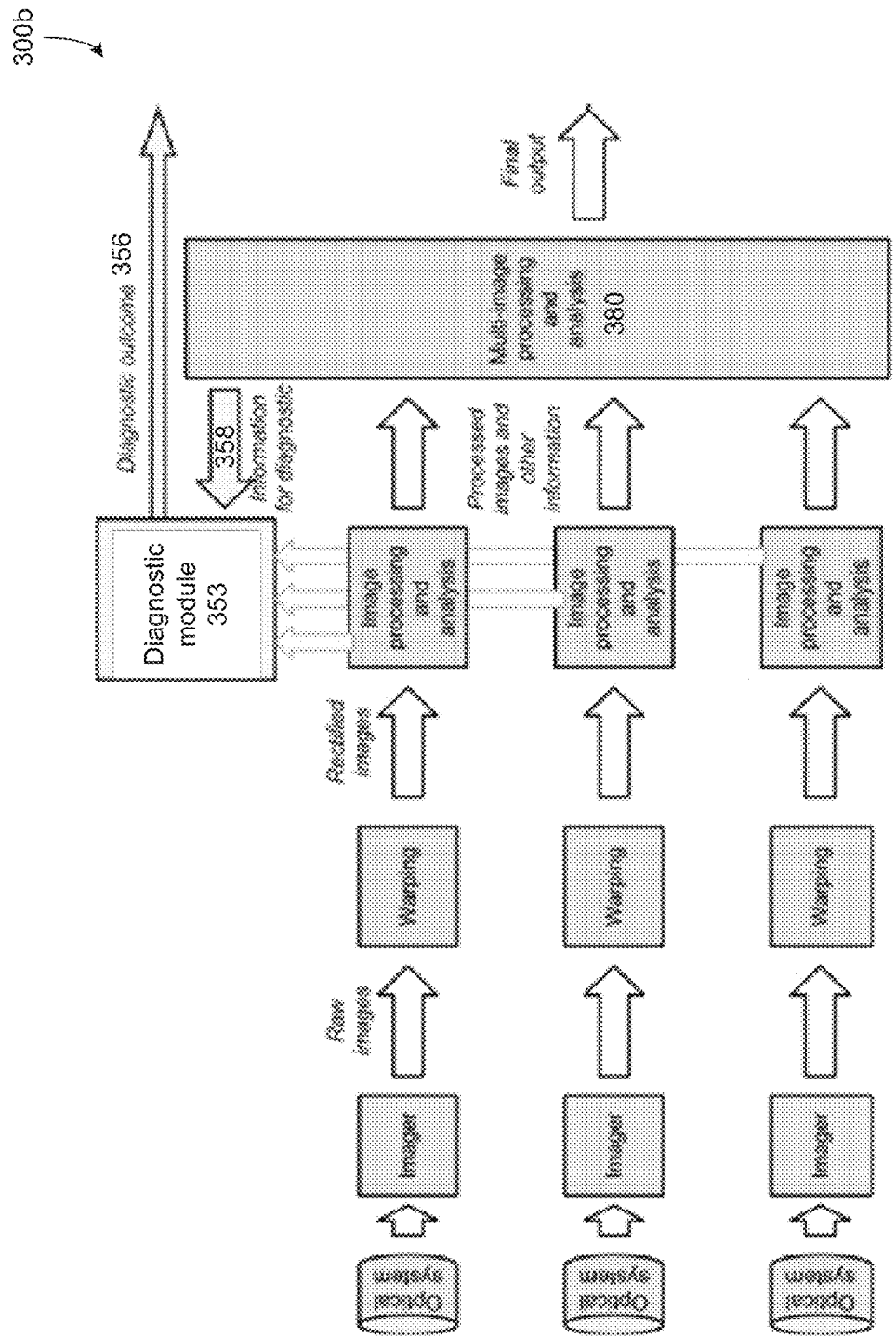
FIG. 3b is a block diagram of a multi-camera imaging system that includes a diagnostic module, according to an alternative embodiment.

Some diagnostic processes may be based in part or entirely on computations that are also performed elsewhere in the image processing pipeline. It may then be useful to not duplicate these computations, but instead use directly the information that has been computed in the pipeline. This is shown in the embodiment of FIG. 3b. The diagnostic module 353 may produce a diagnostic outcome 356 as before, but the diagnostic process that produces this outcome 356 may also use information 358 to do so. In the illustrated embodiment, this information 358 may come from the multi-image processing and analysis module 380.

The architecture described herein may not require interrupting the image processing pipeline. However, in some embodiments, for example if diagnostic-specific warping parameters need to be temporarily applied to the warping stage and the resources of the system are too limited, it may be necessary or preferable to temporarily interrupt the image processing pipeline.

Examples of Diagnostic Algorithms

Examples of diagnostic algorithms are now given. These examples are provided for illustration purposes only.

Epipolar Misalignment Detection Using Image Correspondences

This detection process may take as input one or more pairs of images, produced by two cameras. The process may include the following steps:

Execute a matching process on a pair of images, resulting in a set of M pairs of locations of image features (($u_{1m}$, $v_{1m}$), ($u_{2m}$, $v_{2m}$)), for m in 1 . . . M where each pair represents coordinates of projections of the same 3D world feature in the rectified images produced by the first and second cameras respectively.

Determine the extent of the epipolar misalignment, for example based on the values taken by $v_{1m}-v_{2m}$, in pairs of matching points.

Determine whether the epipolar misalignment is sufficiently small for the image pipeline to run properly.

Note that while the input image pairs may be either raw images or rectified images, the misalignment measure may be based on coordinates in the rectified images. The matching algorithm can be a feature-based method or a dense correspondence (optic flow) method, as would be understood by persons of ordinary skill in the art. In this document, a "matching process" may be defined as any process which identifies pairs of 2D image locations representing projections of the same 3D world feature as produced by the first and second cameras respectively. Also, in the matching process, more than one pair of images can be used, as long as the relative position of the cameras is the same for all pairs of images.

Figure 4:
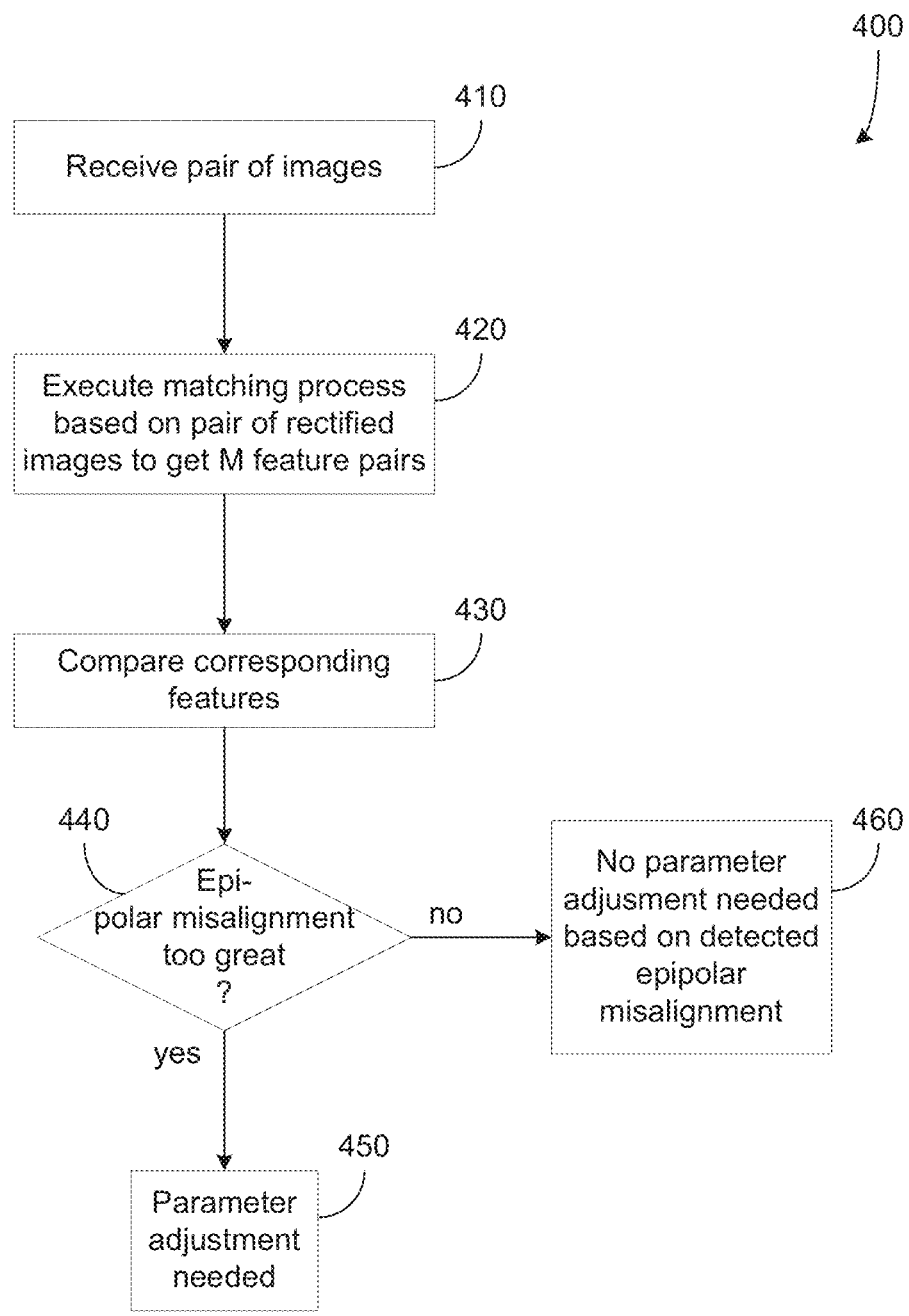
FIG. 4 is a flowchart illustrating determination of whether warping parameters need to be adjusted based on misalignment detection, according to an embodiment.

This process is illustrated in greater detail in FIG. 4, according to an embodiment. At 410, a pair of images may be received. As noted above, while the illustrated embodiment receives rectified images, in an alternative embodiment raw images may be received, then rectified. At 420, a matching process may be executed based on the pair of images, resulting in M corresponding feature pairs. At 430, the vertical coordinates in the rectified images of the corresponding features may be compared, and at 440 a determination may be made as to whether the extent of epipolar misaligmnent is too great. In an embodiment, excessive misalignment may be established if the Y coordinates differ by more than a predefined threshold and/or if this occurs in a number of pairs that exceeds another predetermined threshold. If the extent of misalignment is considered to be too great at 440, then at 450, adjustment of warping parameters is needed. Otherwise, at 460, no adjustment is needed on the basis of the above epipolar misalignment determination. Note that while no adjustment may be needed on these grounds, additional testing (discussed below) may determine that adjustment of warping parameters is needed for other reasons.

Epipolar misalignment detection based on density of dense stereo correspondence

This process may take as input a pair of images, produced by two cameras. This process comprises comparing the number of pixels at which visual texture is sufficient to allow matching by a dense stereo correspondence algorithm, with the number of pixels at which a correspondence was found. Based on the expected performance of the dense stereo correspondence algorithm, and the number of pixels appropriate for this algorithm found in the image, and on some known properties of the scene, it is possible to place a lower bound on the number of correspondences found by the dense stereo correspondence algorithm, under the assumption that the current warping parameters are correct. If the number of found correspondences is below that lower bound, then this may indicate that the warping parameters are incorrect. This detection process may include the following:

Determine the minimum number $N_0$ of pixels for which correspondences would be found, assuming correct warping parameters.

Execute a dense stereo correspondence process on a pair of images, resulting in a set of N pairs of pixel locations.

If $N \geq N_0$, then indicate that the warping parameters are correct, otherwise indicate that N is too small.

This algorithm may be run on a stereo vision system that computes dense stereo correspondences: since stereo correspondence is already being computed, the correspondence process above may be omitted and the correspondences just need to be counted to obtain N.

Figure 5:
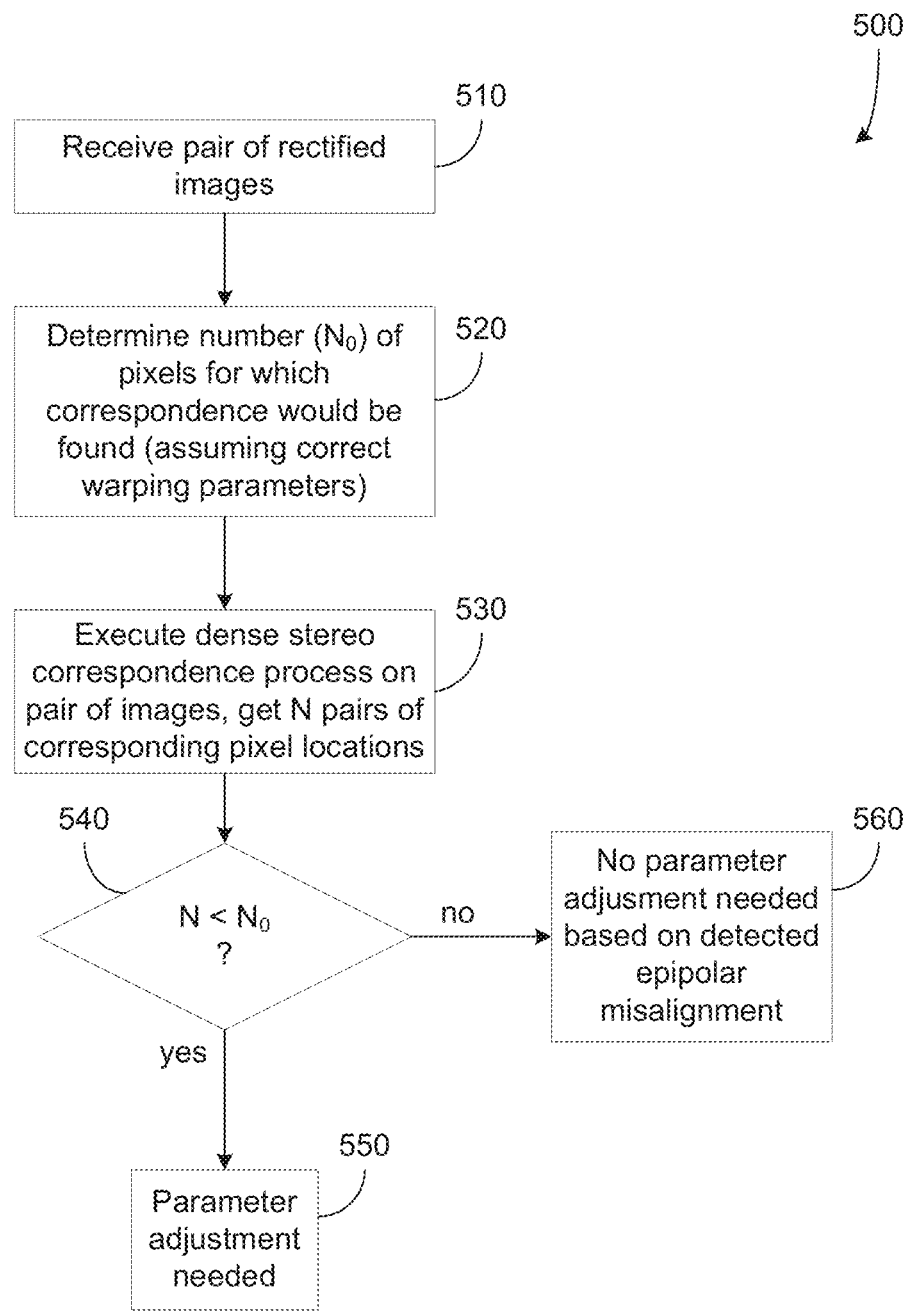
FIG. 5 is a flowchart illustrating determination of whether warping parameters need to be adjusted based on misalignment detection, according to an alternative embodiment.

The above process is illustrated in FIG. 5, according to an embodiment. At 510, a pair of rectified images may be received, originated by two respective cameras. Alternatively, a pair of raw images may be used instead, which may then be rectified. At 520, a value $N_0$ may be determined, where $N_0$ is the number of pixels for which correspondence would be found if the warping parameters were correct. At 530, a dense stereo correspondence process may be executed, yielding N pairs of corresponding pixel locations. At 540, a determination may be made as to whether $N<N_0$. If so, parameter adjustment may be needed as shown at 550. Otherwise, no parameter adjustment may be required on the basis of this procedure, as shown at 560. As noted above, adjustment may also be required on the basis of other indications as described elsewhere in this document.

In this diagnostic, factors to determine the number $N_0$ may include one or more of: the image size; a measure of the visual texture found in the images; knowledge of the physical or optical properties of the scene viewed by the cameras; knowledge of the noise present in the images; and knowledge of the usual performance of the dense stereo correspondence algorithm.

Note that more than one image pair may be used as input, as long as the relative position of the cameras is the same in each image pair. In this case, the number $N_0$ may be adjusted to take into account the increased number of images and the nature of each image.

Detection of Failure in a Metric Stereo Vision System

Inappropriate warping parameters may cause a metric stereo vision system to produce inaccurate measurements. It is possible to detect such a failure, for example when a visually identifiable object in the scene has known geometric properties, such as known dimensions and/or position. In this situation, the failure may be detected by the following: identify, in the images, the projections of one or more 3D point with known geometric properties; using the projections of the 3D points, compute the estimated position of the 3D points; and check that the reconstructed 3D points verify the known geometric properties.

The visually identifiable object may be permanently or sporadically visible to the stereo vision system, either because it has been deliberately placed within the field of view, or because it is known to occur in the field of view. Visually identifiable objects with known properties may include, but are not limited to the following:

In the context of some cameras (for example, outdoors cameras), the moon, stars or the sun may constitute visually identifiable objects. One exploitable known geometric property is that these objects reside at a very great distance from the camera. Some distant natural landmark, a cloud, a building or other man-made feature may serve the same purpose. If the estimated positions of the points are not at a very great distance from the camera, then the metric stereo vision system may likely be failing.

An object comprising two points separated by a known distance may be used. One exploitable known geometric property is the known distance between the two points. For example a wand comprising two visually identifiable points separated by a known distance d may be used to detect a failure of the stereo vision system: if the estimated two points are separated by an estimated distance d' that significantly differs from d, then the system may be failing. Other usable objects may include rectangles of known size such as a business card, a post-it, a checkerboard, a disk, a ruler, a piece of glassware and more generally any object whose geometry is at least partially known to the system and which has some uniquely detectable features, such as corners, line intersections, etc.

In the identification of the projections of 3D points above, to detect features in the image, one or more of the tools available to computer vision practitioners may be used, including but not limited to line detection, color segmentation, ellipse detection, image feature detection, feature matching, etc.

Figure 6:
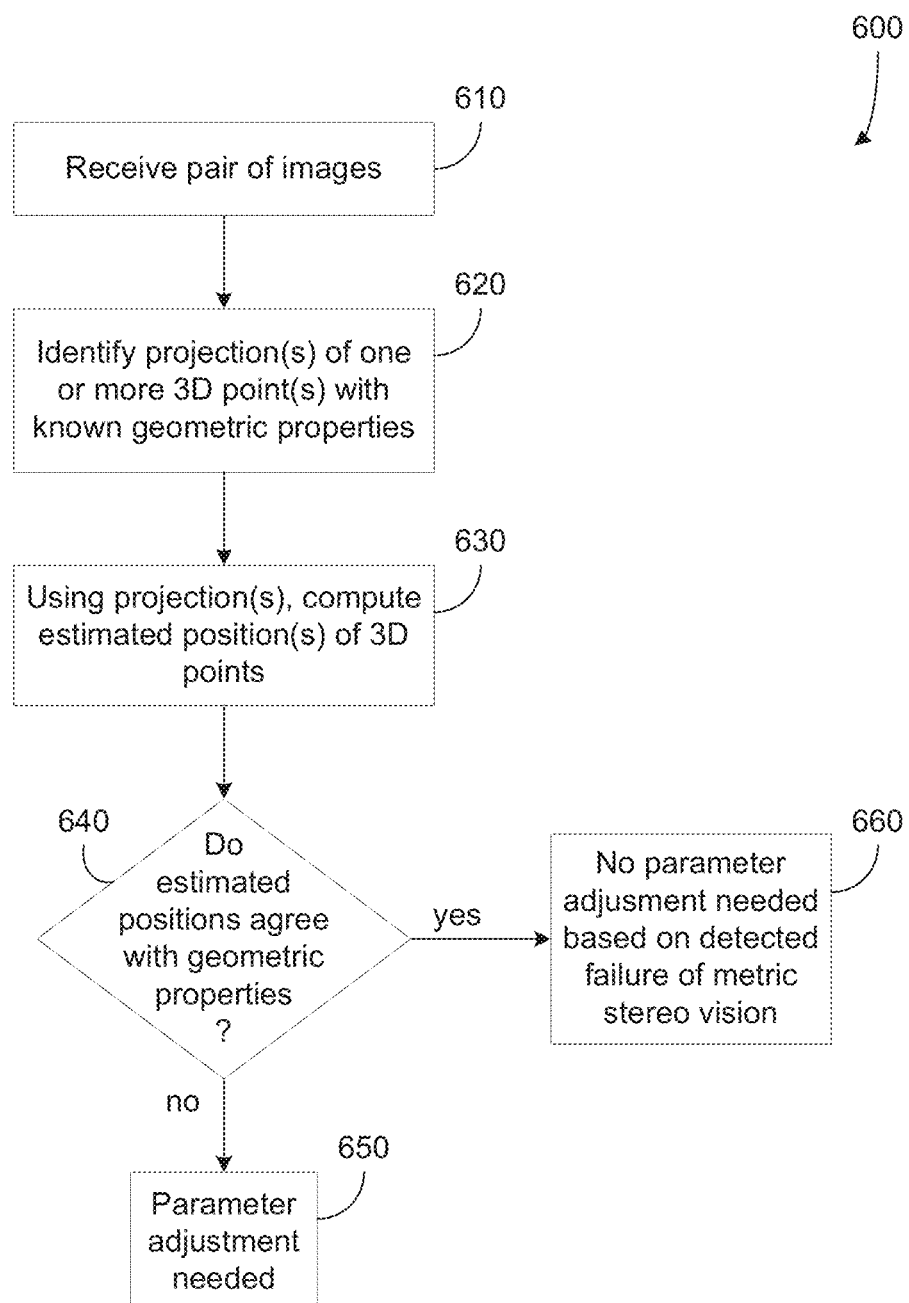
FIG. 6 is a flowchart illustrating determination of whether warping parameters need to be adjusted in the context of a metric stereo vision system, according to an embodiment.

An embodiment of the above process for detecting failure in a metric stereo vision system is illustrated in FIG. 6, according to an embodiment. At 610, a pair of images may be received, where the images may be originated by a pair of respective cameras. As in the cases above, the images may be rectified images, or raw images that are then rectified for subsequent processing. At 620, projections of one or more 3D points may be identified in the rectified images, where the 3D points have known geometric properties. At 630, estimated positions of the 3D points may be calculated, using the projections. At 640, a determination may be made as to whether the estimated positions are consistent with the known geometric properties. If so, then no adjustment of warping parameter(s) is required on the basis of this test, as shown at 660. Otherwise, warping parameter adjustment is needed, as shown at 650.

Optical Distortion Detection

This process detects whether 3D straight lines appear as 2D straight lines in the images. It may be run when it is known that the environment seen by the camera contains one or more identifiable 3D straight lines. This algorithm takes as input one or more images produced by a single imager and as output indicates either that the images are sufficiently distortion-free, or that optical distortion appears high enough as to require further correction. This detection process may proceed as follows: find nearly-rectilinear image curves (or sets of points that are almost aligned); determine which curves are likely to be projections of 3D straight lines; and determine whether the curves (or sets of points) are sufficiently rectilinear for the image processing pipeline to run properly. Various embodiments of this process may run on raw images or run on rectified images. If raw images are used as input, they may be rectified before being used further.

Figure 7:
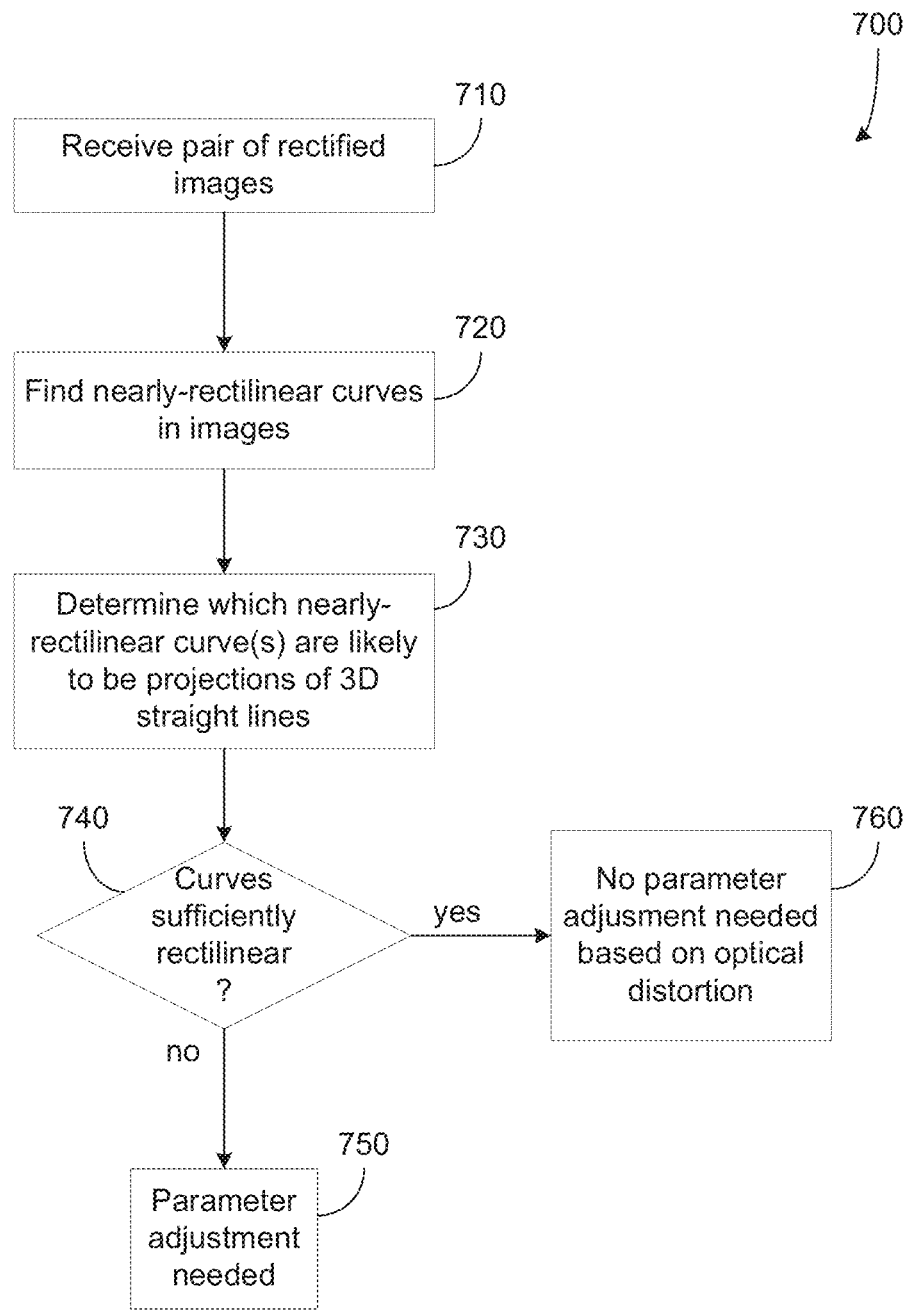
FIG. 7 is a flowchart illustrating determination of whether warping parameters need to be adjusted based on optical distortion detection, according to an embodiment.

The process of detecting optical distortion is illustrated in FIG. 7, according to an embodiment. At 710, a pair of images may be received, where the images are originated by two respective cameras. As in the previous cases, a pair of raw images may be received and then rectified. At 720, nearly-rectilinear curves may be identified in the images. At 730, those nearly-rectilinear curves that are likely to be projections of 3D straight line segments may be determined. At 740, a determination may be made as to whether these determined curves are sufficiently rectilinear. If so, then no adjustment of warping parameters may be needed on the basis optical distortion detection described above, as shown at 760. Otherwise, adjustment of parameters may be needed, as shown at 750.

Taking into Account Imperfect Diagnostics

In some circumstances, the above diagnostic processes may fail. This may be due to flawed feature detection, for example. It is possible to devise better diagnostics based on failure-prone diagnostics. Means of doing so may include: using multiple diagnostic processes and compounding their outputs in a single output; gathering the output of one or more diagnostic processes over a period of time before diagnosing a failure; and/or graduating and giving qualitative labels to the output of the diagnostic processes, to allow for more nuanced assessment. The use of multiple diagnostic processes above may be implemented by applying empirically determined rules or by applying rules determined by automatic machine learning algorithms.

Note that a process that determines appropriate warping parameters may also be used for diagnostic purposes: if a warping parameter determination method results in appropriate warping parameters $\Theta_a$ ("a" as in "appropriate"), while the image processing pipeline currently uses warping parameters $\Theta_0$, then, by comparing $\Theta_a$ and $\Theta_0$, one may determine whether parameters $\Theta_0$ are appropriate. In some cases, this diagnostic method may be used as a sole source of diagnosis. In other cases, for example, if such a warping parameter determination method requires significant resources, or cannot be performed without interrupting the pipeline or hampering the operations of the system, then it may be preferable to use a distinct diagnostic process such as one of the methods described above.

Determining Adjusted Warping Parameters

The following describes the determination of new warping parameters for an image processing pipeline without necessarily interrupting the pipeline. In some embodiments, the processing may proceed iteratively, starting from the warping parameters that are currently used in the pipeline, and find adjustments to improve these warping parameters. In some embodiments, the process may compute new parameters from scratch. In this document, both types of methods are identified as "warping parameter adjustment methods" or simply adjustment methods.

Figure 8:
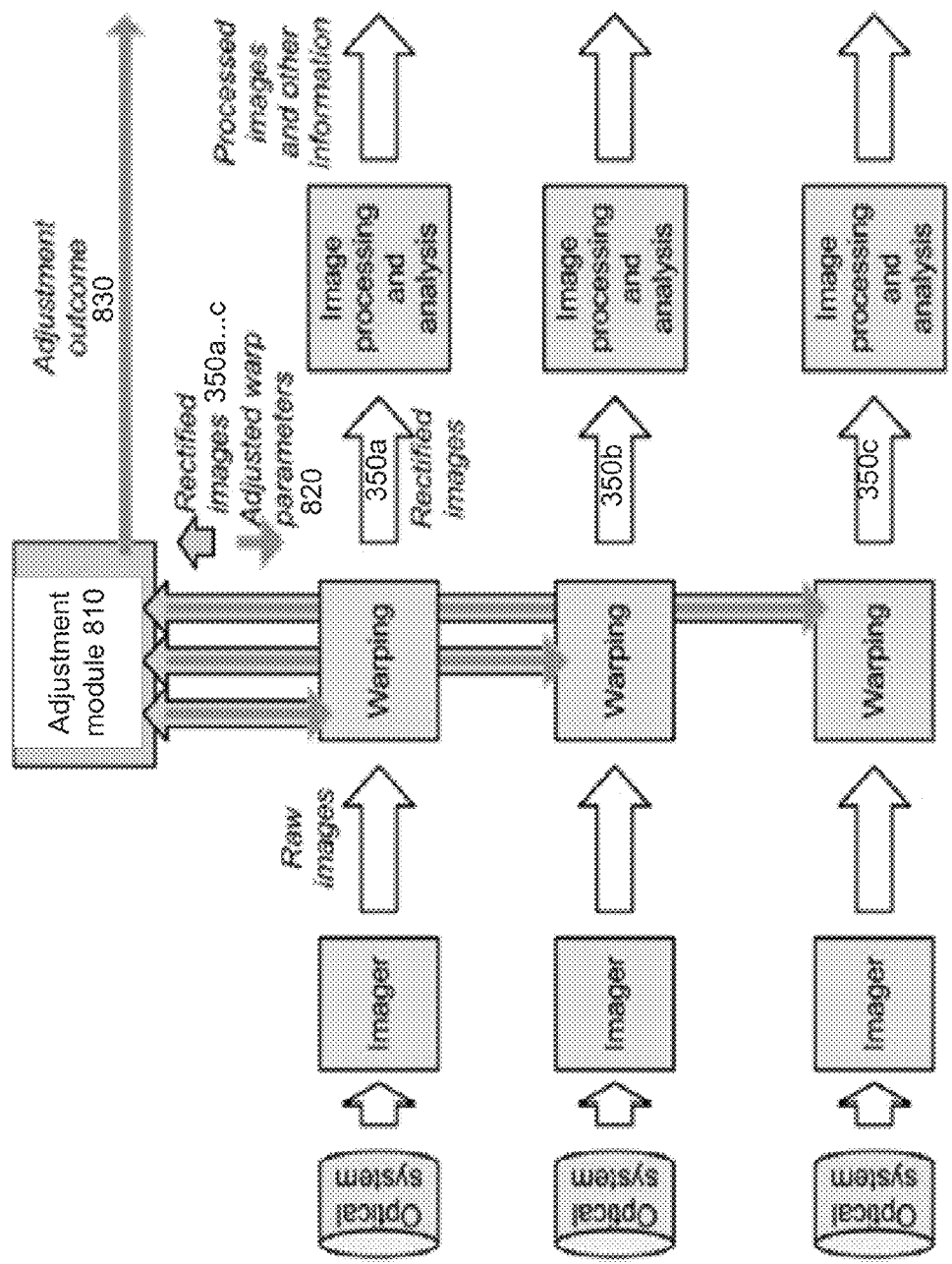
FIG. 8 is a block diagram of a multi-camera imaging system that includes an adjustment module, according to an embodiment.

FIG. 8 illustrates part of an image processing pipeline according to an embodiment, similar to that illustrated in FIGS. 1, 3a, and 3b, with an added adjustment module 810. This module may receive rectified images 350a . . . c and produce adjusted warping parameters 820. In an embodiment, adjustment module 810 may also produce an adjustment outcome 830. This may be a binary indication that parameters were (or were not) adjusted. Alternatively, the adjustment outcome 830 may include additional information, such as the parameters that have been adjusted, and/or their new values. The adjustment outcome 830 may be used for process control purposes, for example. The illustrated adjustment processing may be executed by the same computing platform that executes other tasks on the pipeline or on a different computing platform, or on dedicated electronic hardware. The adjustment process may be run continuously or sporadically. For example, it could be run at fixed or randomized time intervals, or it could be run only when triggered by a diagnostic process. Adjustment module 810 may be incorporated with diagnostic module 353 in a single software, firmware, or hardware module; alternatively, modules 810 and 353 may be implemented in separate software or firmware logic.

In an embodiment, the adjustment process may include the following: acquire one or more images; run an adjustment process on the acquired images; store and/or transmit the outcome of the adjustment algorithm; and, if the outcome of the adjustment algorithm allows, and the system has this capability, then use the resulting warping parameters in the warping stage of the image pipeline.

Figure 9:
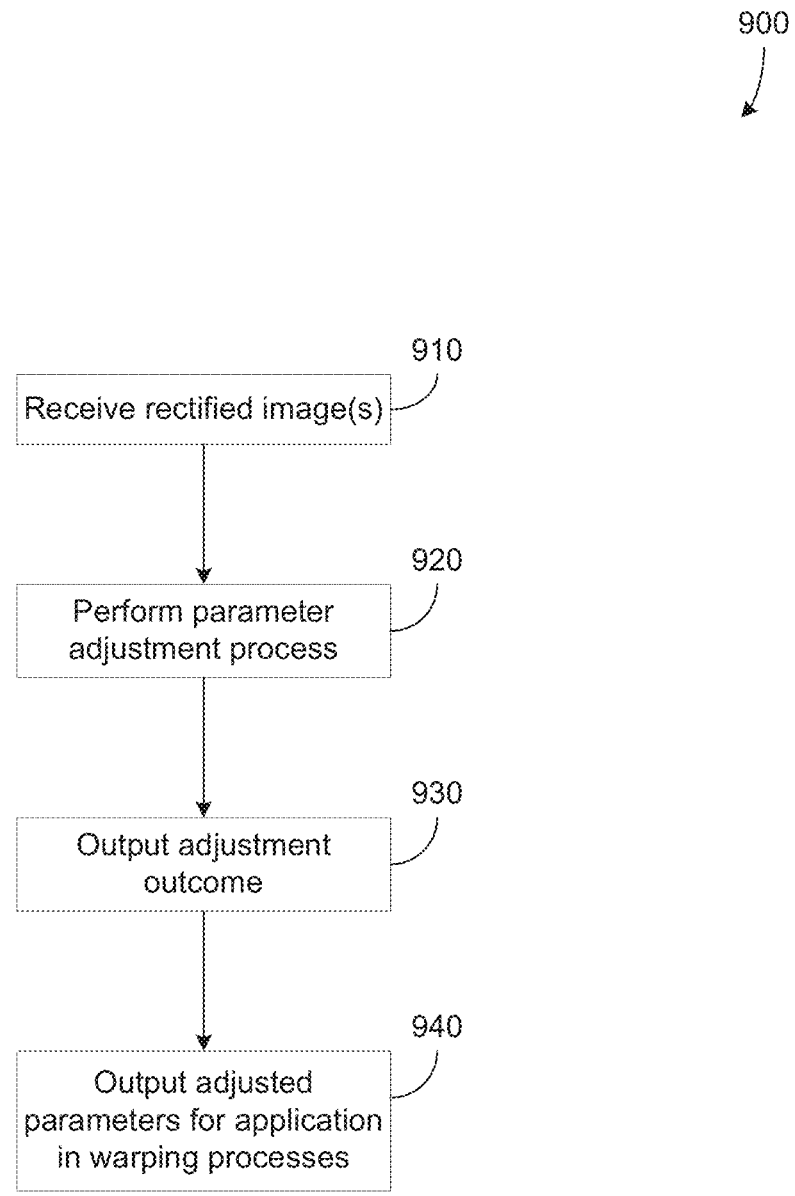
FIG. 9 is a flowchart illustrating adjustment of warping parameters, according to an embodiment.

An embodiment of such a warping parameter adjustment process is illustrated in FIG. 9, according to an embodiment. At 910, one or more rectified images may be received. At 920, a parameter adjustment process may be performed. At 930, an adjustment outcome may be output, e.g., outcome 830. As noted above, this may include a binary indication as to whether parameters have been adjusted, the identity of adjusted warping parameters, and/or newly adjusted parameter values. At 940, the adjusted warping parameters may be output for use by warping modules, assuming that the adjustment process yields adjusted parameters.

In some embodiments, as with the diagnostic processes described above, it may be possible to provide warping parameters that are specific to the adjustment process.

In some embodiments, as with the diagnostic processes described above, the adjustment algorithm may use information that has been computed in the image processing pipeline at stages other than the image warping stage.

In some embodiments, the outcome of lime adjustment algorithm may be transmitted to a process that controls the image processing pipeline. It may then be this control process that performs the utilization of the new warping parameters, based on the outcome of the adjustment algorithm and on other information available to the system.

Examples of Adjustment Processes

These following parameter adjustment examples are provided for illustration purpose only.

Correcting Epipolar Misalignment Using Image Feature Correspondences

This adjustment process may take as input one or more pairs of images, where each image in a pair is produced by one of two respective cameras. The process may include the following:

Execute a feature-based matching process on a pair of images, resulting in a set of M locations of feature pairs the respective raw images: $((u'_{1m}, v'_{1m}), (u'_{2m}, v'_{2m}))$, for min 1 ... M, where $(u'_{1m}, v'_{1m})$ (and, respectively, $(u'_{2m}, v'_{2m})$) are the coordinates of features in the images produced by the respective first and second camera.

Determine warping parameters such that a measure of vertical misalignment of the warped feature locations $((u_{1m}, v_{1m}), (u_{2m}, v_{2m}))$, in the rectified image, is minimized.

Determine whether the epipolar misalignment is sufficiently small for the it age pipeline to run acceptably.

Figure 10:
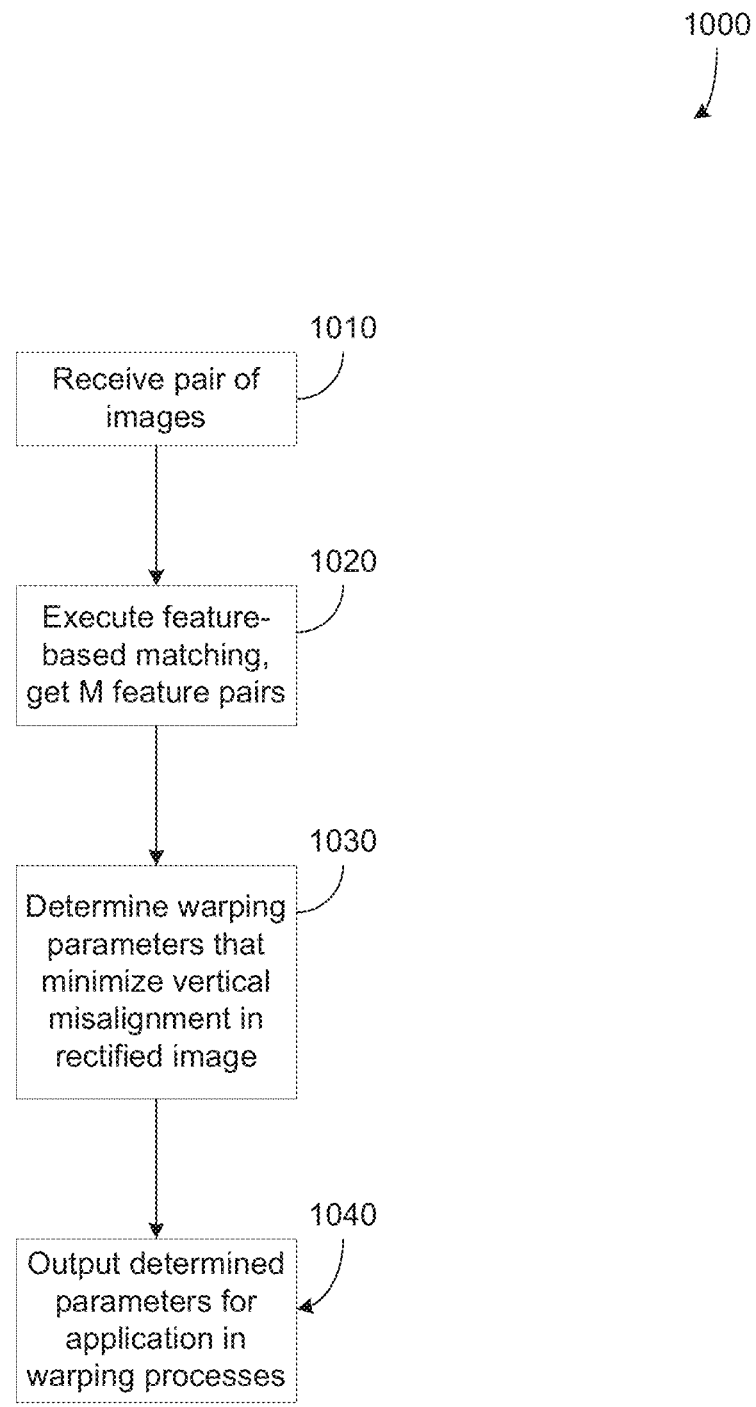
FIG. 10 is a flowchart illustrating adjustment of warping parameters in response to epipolar misalignment, according to an embodiment.

The above is illustrated in FIG. 10, according to an embodiment. At 1010, the pair of images may be received. At 1020, a feature-based matching process may be executed, resulting in M feature pairs. At 1030, warping parameters may be determined, where these parameters minimize vertical misalignment in a rectified image. At 1040, the parameters determined at 1030 may be output for use in the warping process.

Note that, while the input image pairs may be either raw images or rectified images, the misalignment measure may be computed from the coordinates in the rectified images. In the feature-based matching process, the feature-based matching algorithm may be chosen from one of the numerous methods known to persons of ordinary skill in the art.

In the feature-based matching process, coordinates of features in the raw image can be obtained even if the raw images themselves are not immediately available. This may be done by finding matched feature pairs $((a_{1m}, b_{1m}), (a_{2m}, b_{2m}))$ in the rectified images, for min 1 ... M, and then mapping them to the raw image coordinates using the warping parameters $\Theta^1_0$ and $\Theta^2_0$ that are currently used in the pipeline, resulting in $(u'_{1m}, v'_{1m}) = f(a_{1m}, b_{1m}, \Theta^1_0)$ and $(u'_{2m}, v'_{2m}) = f(a_{2m}, b_{2m}, \Theta^2_0)$.

In the above determination of parameters, $(u_{1m}, v_{1m}) = f^1(u'_{1m}, v'_{1m}, \Theta^1_0)$ and $(u_{2m}, v_{2m}) = f^1(u'_{2m}, v'_{2m}, \Theta^2_0)$.

The above determination of parameters may be formulated finding the solution of a numerical optimization problem. The objective function $\mu(\ )$ of this optimization problem may be the measure of vertical misalignment in the warped feature locations. Examples of measures of vertical misalignment that can be used in parameter determination may include:

$\mu_1(\Theta) = (1/M)\Sigma^M_{m=1} |v_{1m} - v_{2m}|$, the average absolute vertical misalignment;

$\mu_2(\Theta) = [(1/M)\Sigma^M_{m=1}(v_{1m} - v_2)^2]^{1/2}$, the square root of the average squared vertical misalignment;

$\mu_3(\Theta) = \max_m\{|v_{1m} - v_{2m}|\}$, the maximum absolute vertical misalignment over all m; and $\mu_4(\Theta) = (1/M)\Sigma^M_{m=1}\psi(v_{1m} - v_{2m})$, a robust vertical misalignment measure where $\psi(\ )$ is a robust score function.

Other measures of vertical misalignment may be used. The parameters $\Theta$ may be found using one of the many available optimization algorithms, such as stochastic gradient descent, Nelder-Mead, conjugate gradient, variable metric, Gauss-Newton, or Levenberg-Marquardt.

A misalignment may be measured as follows, according to an embodiment. Given a set of pairs of feature locations $((u'_{1m}, v'_{2m}), (u'_{2m}, v'_m))$ for m in 1 ... M, $\mu_2(\Theta)$ may be computed by executing the following:

Input: Warping parameters $\Theta = (\Theta^1, \Theta^2)$

Locations in the raw images of matched features $((u'_{1m}, v'_{1m}), (u'_{2m}, v'_{2m}))$ for m in 1 ... M.

Output $\mu_2(\Theta)$:

Set $\mu = 0$ for m 1: M compute $(u_{1m}, v_{1m}) = f^1(u'_{1m}, v'_{1m}, \Theta^1_0)$ compute $(u_{2m}, v_{2m}) = f^1(u'_{2m}, v'_{2m}, \Theta^2_0)$ set $\mu + \mu + (v_{1m} - v_{2m})^2$ end for return $(\mu/M)^{1/2}$ This process may be modified to compute $\mu_1(\Theta)$, $\mu_3(\Theta)$, $\mu_4(\Theta)$ in alternative embodiments. The measure of misalignment only needs be monotonically increasing with the measure $\mu_2(\Theta)$, so the square root and the division by M in the last line of the above pseudocode may be skipped in alternative embodiments. For efficiency reasons, one may also forgo the computation of the horizontal component of the points, $u_{1m}$ and $u_{2m}$, since the above calculation only uses the vertical components.

In some embodiments, the parameter determination may produce an error unless M is greater than a determined threshold. In some embodiments, parameter determination may produce an error unless the features are spread out evenly enough in the image.

In some embodiments, the optimization problem may be solved using an optimization method that does not require an initial starting point. Such a method may be a closed-form calculation or a global optimization method, for example.

In some embodiments, the optimization problem may be solved using an optimization method that requires an initial starting point. In embodiments where an initial starting point is needed, the initial starting point may be the warping parameters that are currently being used in the image processing pipeline, denoted $\Theta_0$.

In some embodiments, the search space of the optimization problem may include all possible values of warping parameters.

In some embodiments, the search space may be restricted. For example, the search space may be defined relative to the current warping parameters $\Theta_0$. For example, if the warping includes a projective transformation defined by a matrix A, then the search space may be restricted to include only projective transformations of the form AR, where R is a rotation matrix. This restricted search space may be useful in the case where the cameras in a stereo vision system have rotated with respect to each other but have not translated. In this last example, the search space may be further restricted to a subset of all the possible rotation matrices, for example to the rotations around an axis that is in the X-Z plane: this restriction may allow vertical adjustment of the location of the image features while at the same time limiting the horizontal displacement of the features due to the adjustment. In a stereo system, the distance between a 3D point to the camera may be estimated based on the disparity between the horizontal locations at which this 3D point projects; thus, by limiting the horizontal displacement of the features due to the adjustment, the introduction of changes in the measures in the measured location of 3D points may be limited, if the stereo system, instead of having the usual horizontal baseline (i.e., the line segment between its centers of projection) had a vertical or other baseline, then the rotation would be constrained to have its axis in the plane formed by the baseline and the optical axis of the camera.

In some cases, the optimization problem that is solved in the parameter determination may have more than one optimal solution within the search space. In such cases, other criteria (other than $\mu(\ )$) may be used to choose a particular solution.

Correcting Metric Inaccuracy in a Stereo Vision System

Processes for correcting metric inaccuracy may have some similarities with the previously presented process for correcting epipolar misalignment. This parameter adjustment process may take as input one or more pairs of images, where the two images of a pair are produced by two respective cameras. It may be assumed that a visually identifiable object of known dimensions is in the scene. Another way of saying that an object is visually identifiable, is to say that it is possible to identify the M locations $((u'_{1m}, v'_{1m}), (u'_{2m}, v'_{2m}))$ for $1 \leq m \leq M$, of image features, where these locations are the projections of 3D points $P_m$ with known coordinates $(X_m, Y_m, Z_m)$ in a reference system attached to the object. Note that in this example, it is not assumed that the position of the points is known with respect to the cameras. Like in the adjustment method for epipolar geometry, the locations in the raw images $(u'_{1m}, v'_{1m}), (u'_{2m}, v'_{2m})$ may have been obtained without actually having access to the raw images: the locations of projections of points on the known object may be identified in the rectified images, resulting in locations $(a_{1m}, b_{1m}), (a_{2m}, b_{2m})$ from which $(u'_{1m}, v'_{1m}) = f(a_{1m}, b_{1m}, \Theta^1_0)$ and $(u'_{2m}, v'_{2m}) = f(a_{2m}, b_{2m}, \Theta^2_0)$ may be obtained.

In a metric stereo vision system, the relative position of the cameras, their focal lengths and principal points may be known, so that, for a given pixel $(u, v)$ in a rectified image, the 3D half-line that starts at the optical center of the camera and passes through the pixel may be constructed. This ray will be referred to herein as the ray that emanates from pixel $(u, v)$.

For a given set of warping parameters $\Theta$, locations $(u_{1m}, v_{1m}) = f^1(u'_{1m}, v'_{1m}, \Theta^1)$ and $(u_{2m}, v_{2m}) = f^{-1}(u'_{2m}, v'_{2m}, \Theta^2)$ may be computed. It may then be possible, using computer vision methods, to intersect the rays that emanate from $(u_{1m}, v_{1m})$ and $(u_{2m}, v_{2m})$, resulting in estimated point positions $P'_m = (X'_m, Y'_m, Z'_m)$.

The metric quality of the parameters $\Theta$ may be measured by comparing the estimated distances between pairs of points, $d'_{mn} = \|P'_m - P'_n\|$, with the known distances $d_{mn} = \|P_m - P_n\|$. Cost functions that measure the discrepancy between the true 3D shape and the estimated 3D shape may include, without limitation:

$$v_1(\Theta) = [2/(M(M-1))]\Sigma_{m \neq n} |d'_{mn} - d_{mn}|$$

$$v_2(\Theta) = [2/(M(M-1))]\Sigma_{m \neq n} (d'_{mn} - d_{mn})^2)^{1/2}$$

$$v_3(\Theta) = [2/(M(M-1))]\Sigma_{m \neq n} (|d'_{mn} - d_{mn}|/d_{mn})$$

These quality measures are given for example purposes. Other quality measures may be used in other embodiments.

A process for correcting metric inaccuracy in a stereo vision system may then include the following:

Identify in one or more pairs of images the locations $((u'_{1m}, v'_{1m}), (u'_{2m}, v'_{2m}))$, for m in 1 ... M, of projections of 3D points $P_m$, where $((u'_{1m}, v'_{1m}), (u'_{2m}, v'_{2m}))$ are the coordinates of features in a pair of raw images produced by the respective first and second cameras.

Determine warping parameters $\Theta$ that minimize a measure $v(\Theta)$ of the discrepancy between the true and estimated 3D points.

Determine whether the discrepancy measure $v(\Theta)$ is acceptably small for the image pipeline to run properly.

Figure 11:
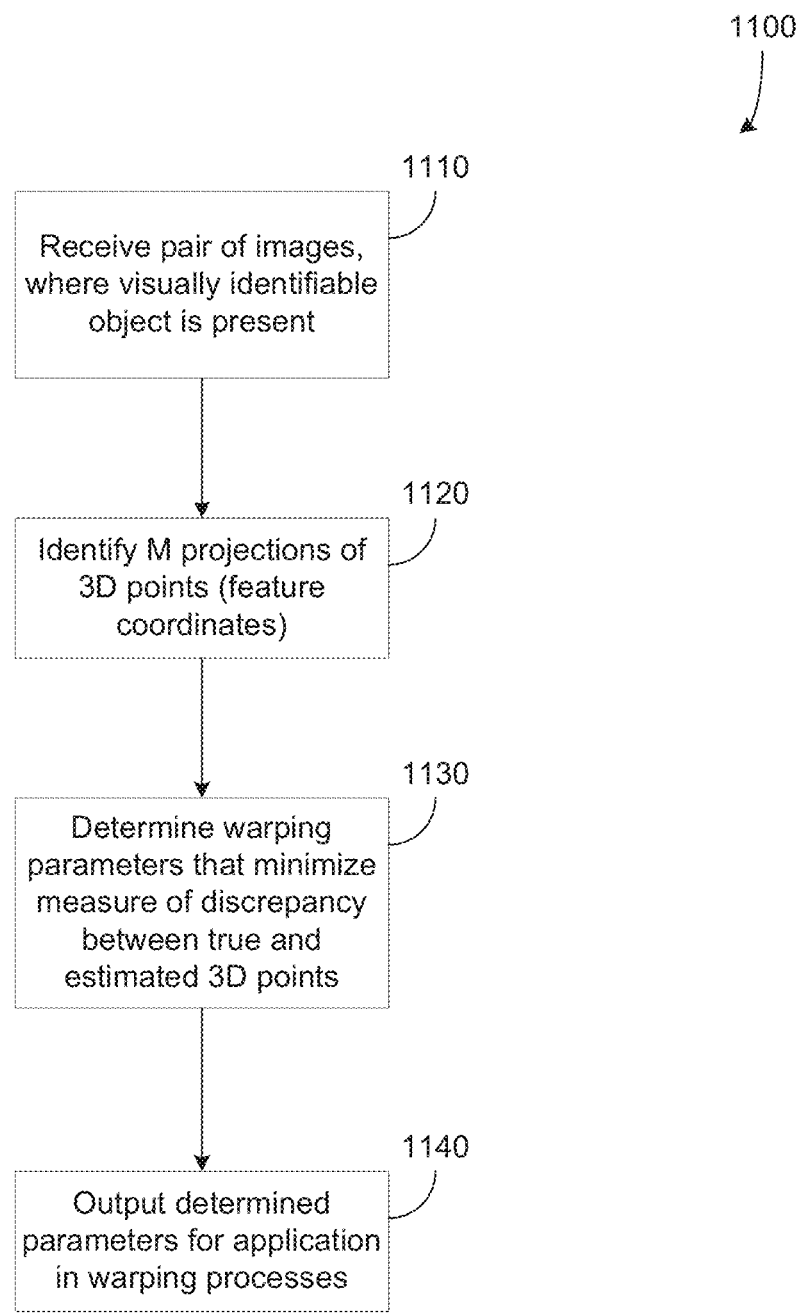
FIG. 11 is a flowchart illustrating adjustment of warping parameters in the context of a metric stereo vision system, according to an embodiment.

This is illustrated in FIG. 11, according to an embodiment. At 1110, a pair of images may be received, where a visually identifiable object is present. At 1120, M projections of 3D points may be identified. At 1130, warping parameters may be determined, where these parameters minimize a measure of discrepancy between the true and estimated 3D points. At 1140, the determined warping parameters may be output for use in the warping process.

The same considerations about the optimization process of correcting epipolar misalignment using image feature correspondences may be applied to the optimization process of the parameter determination performed in correction of metric inaccuracy in a stereo vision system.

In some embodiments, the search space in the above parameter determination may include all possible warping parameter values. In this case, the adjustment process may be viewed as equivalent to the calibration of the stereo vision system.

In some embodiments, the search space in the above parameter determination may comprise a reduced subset of possible parameters. It may be advantageous to use a subset of possible warping parameters: the computations may be easier; fewer 3D points may be needed on the known object (i.e., the method can work with smaller M). This may allow use of a simpler known object and one that may be monetarily or computationally less costly.

In some embodiments, the search space may be defined relative to the current warping parameters $\Theta_0$. For example, if the warping includes a projective transformation defined by a matrix A, then the search space may be restricted to include only projective transformations of the form AR, where R is a rotation matrix. This restricted search space may be useful in the case where the cameras in a stereo vision system have rotated with respect to each other but have not translated. In this last example, the search space may be further restricted to a subset of all the possible rotation matrices—for example, to the rotations around an axis that is in the Y plane. This restriction may allow horizontal adjustment of the location of the image features while at the same time limiting the vertical displacement of the features due to the adjustment. In many stereo systems, it is assumed that matching points lie on the same image scanline, so that any unintentional vertical displacement due to warping may hamper the matching method. At the same time, adjusting the horizontal location of the features may allow adjustment of the estimated point position so it better matches the known 3D point position.

In some embodiments, the process for correction of metric inaccuracy in a stereo vision system may be run in conjunction with the correction of epipolar misalignment using image feature correspondences. In particular, since some computational tasks, including image processing and feature detection tasks, may be identical in the two algorithms, some computation may be done using shared resources.

Optical Distortion Correction

This process attempts to find warping parameters such that 3D straight lines appear as 2D straight lines in the images it may be UM when it is known that the environment seen by the camera contains 3D straight lines. This process is known as the plumb-line method in the computer vision community. It may take as input one or more images taken by a single imager and may produce either an error, or a set of rectification parameters. This correction process may include the following:

find rectilinear or nearly-rectilinear curves (or sets of points that are almost rectilinear) in the images, determine which curves are likely to be projections of 3D straight lines, and attempt to find warping parameters such that the curves are as rectilinear as possible in the rectified image.

if such warping parameters cannot be found, then output an error. Otherwise, indicate success and return the parameters.

Figure 12:
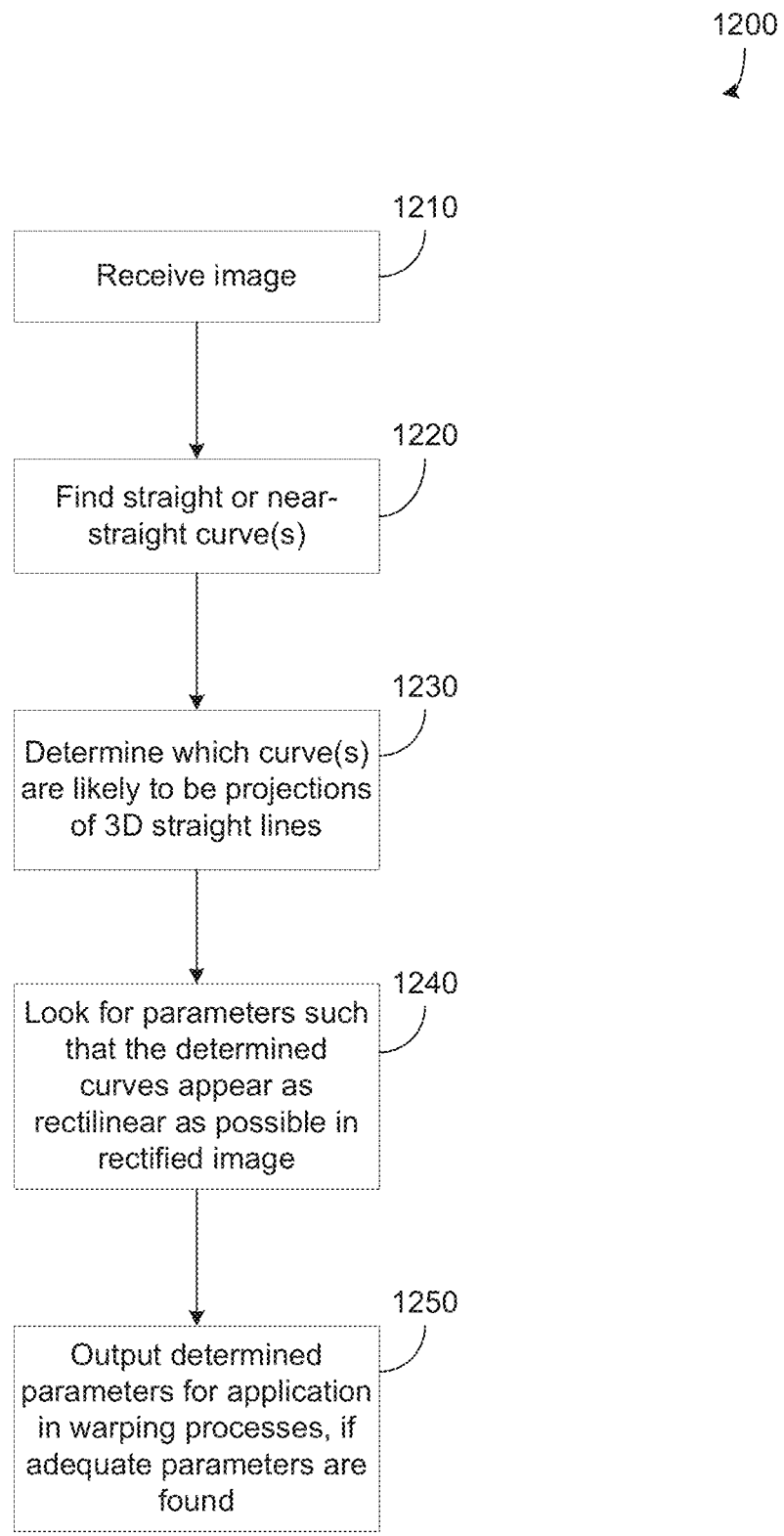
FIG. 12 is a flowchart illustrating adjustment of warping parameters in response to optical distortion, according to an embodiment.

This process is illustrated in FIG. 12, according to an embodiment. At 1210, an image may be received. At 1220, straight or near-straight curves may be found in the image. At 1230, it may be determined which curve(s) are likely to be projections of 3D straight line segments. At 1240, warping parameters may be sought where these parameters make determined curves appear as rectilinear as possible in the corresponding rectified image. At 1250, the determined warping parameters may be output for use in the warping process if adequate parameters are found.

Different embodiments of this process may run on raw images or run on rectified images. This process may be implemented in any of several ways as would be understood by a person of ordinary skill in the art.

A Method to Diagnose and Adjust Warping Parameters on the Fly

Below is an example of a method that adjusts warping parameters in a stereo vision system during run time (on-the-fly). This method may determine whether the warping parameters used in a stereo vision system correctly align epipolar lines and, if not, attempts to find adjusted warping parameters that correctly align epipolar lines.

Capture a pair of rectified images from the image processing pipeline, $I_1$, $I_2$, where $I_1$ is produced by the first camera and $I_2$ is produced by the second camera.

Extract image features in the rectified images for example, Harris-Stephens features.

If too few image features are found, then indicate that diagnosis is not feasible due to insufficient image features and return.

Find correspondences between features in $I_1$ and features in $I_2$—for example using the method of Hartley and Zisserman (See "Multiple View Geometry in Computer Vision," Richard Hartley and Andrew Zisserman, Cambridge University Press, 2000).

If too few correspondences are found, then indicate that diagnosis is not feasible due to insufficient correspondences and return.

Compute measure of vertical misalignment $\mu(\Theta_0)$ observed in the corresponding image features.

If the vertical misalignment $\mu(\Theta_0)$ is small enough, then indicate that the epipolar Geometry is correct and return. Otherwise, indicate that the warping parameters need adjustment and continue.

Search for warping parameters $\Theta$ that reduce or minimize vertical misalignment $\mu(\Theta)$.

If vertical misalignment $\mu(\Theta)$ is small enough, then indicate that appropriate warping parameters have been found, namely $\Theta$, and return. Otherwise, indicate that appropriate warping parameters cannot be found and return.

In regard to finding too few correspondences, the threshold for this may be based on the degrees of freedom of the warping map. For example, 10 features are often sufficient. The requirement for finding enough image features has the purposes of providing an accurate diagnostic and of saving computational resources when it may be predicted early that too few correspondences will be found. Therefore, when tying to find enough image features, a threshold minimum number of features may be used that is not less than the threshold minimum number of correspondences used for finding sufficient correspondences. The capturing of rectified images may be omitted if another component of the image processing pipeline can provide image features to this process.

A person of ordinary skill in the art would recognize that this method can be performed using features located in raw images instead of rectified images. As previously noted, this is possible because one can readily map feature locations in raw images to or from locations in the rectified images.

The requirement that $\mu(\Theta)$ be small enough refers to the comparison of $\mu(\Theta)$ with a threshold $\rho$. This threshold may be set based on several factors including: the requirements of the image processing pipeline; the accuracy with which image features are located; and the properties of the misalignment measure $\mu(\ )$. For example, if half a pixel of vertical misalignment is the maximum tolerable, where features are located with integer accuracy, and where a robust error measure is used in $\mu(\ )$, a value of $\rho=0.5$ may be used as threshold to determine if $\mu(\Theta)$ is small enough.

In the search for warping parameters $\Theta$ that reduce or minimize vertical misalignment, any of a number of known numerical optimization techniques may be used, chosen for example based on the available resources to perform arithmetic operations, the available memory space, and/or the ease of implementation or monetary cost of the final system.

If an iterative numerical optimization method is chosen, then the warping parameters $\Theta_0$ currently used in the image processing pipeline may be used as an initial starting point; alternatively, an initial starting point could be provided by the process that controls the execution of the above process. For example, if this process had been previously run until the search for warping parameters, but its result $\Theta$ had not been applied to the image processing pipeline (for example because $\mu(\Theta)$ was not small enough), then these values could nevertheless be used as a starting point in the search in subsequent runs of this process.

If an iterative numerical optimization method is chosen, then the termination criterion may be chosen amongst the many known criteria, or the termination criterion may be based on the computational resources consumed by the numerical optimization method. For example, the numerical optimization method may be terminated after a fixed amount of time has gone by or after a fixed number of iterations; the numerical optimization is thereby truncated. Examples of such methods include but are not limited to stochastic gradient descent and averaged stochastic gradient descent.

If an optimization method is truncated and finds parameters such that $\mu(\Theta)$ was not small enough, but still smaller than $\mu(\Theta_0)$, then it may be advantageous to store the parameters $\Theta$ and use them as initial starting point the next time that this process is run and reaches the point of the parameter search. This way, the next time that the process is run, it may start from a more advantageous starting point and thus be more likely to succeed. In this case, it may also be advantageous to replace the current warping parameters $\Theta_0$ that are used in the pipeline by $\Theta$.

Controlling the Diagnosis and Adjustment Process

Figure 13:
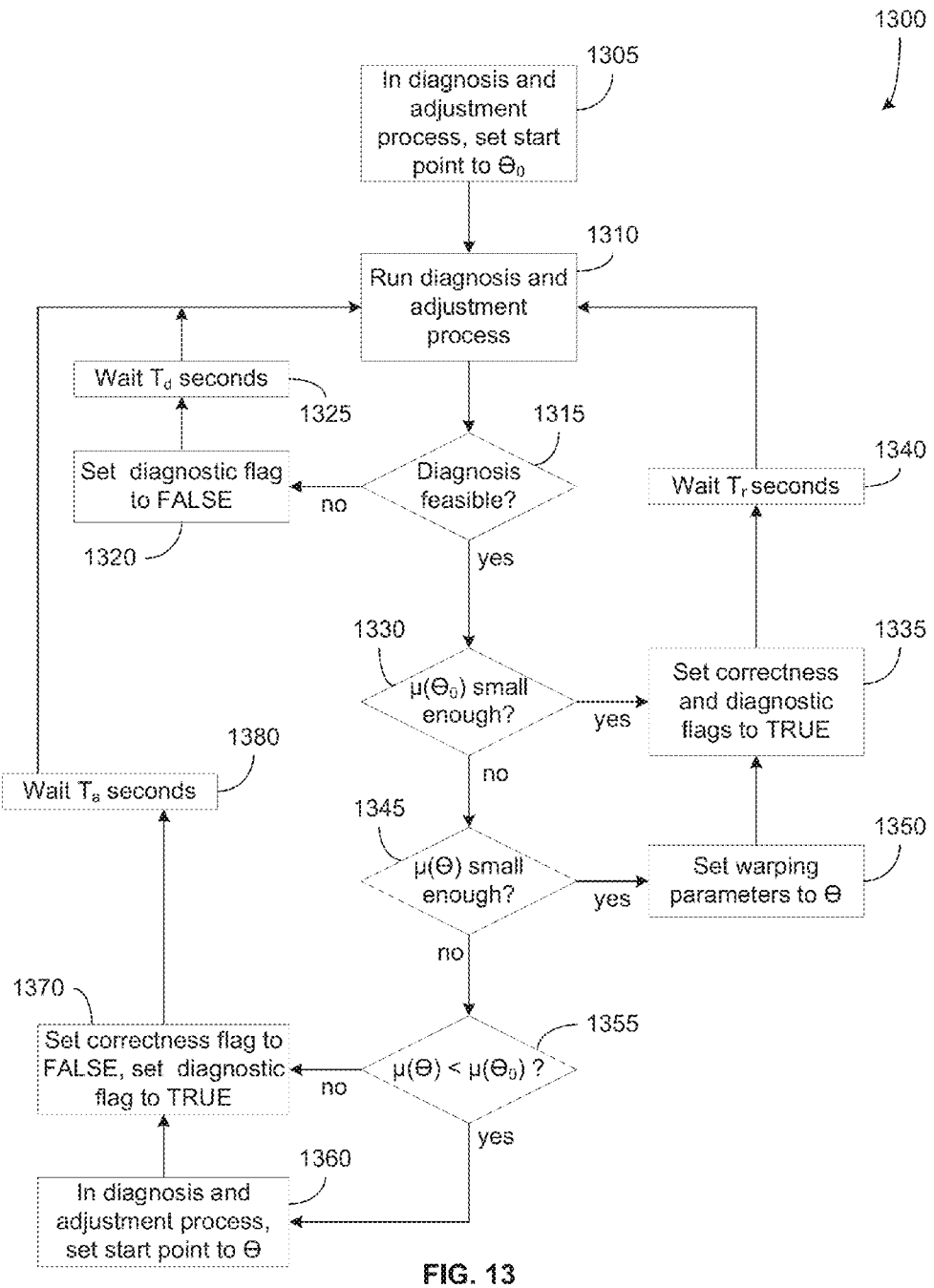
FIG. 13 is a flowchart illustrating control of the processes described herein, according to an embodiment.

FIG. 13 shows an embodiment of a process that periodically runs the above diagnosis and adjustment process. In this flowchart, $\Theta_0$ represents the warping parameters currently used by the image processing pipeline, $\Theta$ represents the warping parameters produced by the diagnosis and adjustment process, and $\mu(\Theta)$ represents the value taken by a vertical misalignment measure, for the parameters $\Theta$. This control process may read warped images from the image processing pipeline and may read and set the warping parameters of the image processing pipeline. It may also have access to computation resources to run the diagnosis and adjustment process. The state of this process includes two flags that may take values of "TRUE" or "FALSE":

a "Diagnostic" flag, which is TRUE when the last run of the diagnosis and adjustment process has been able to reach the computation of vertical misalignment (for example, when enough image features have been put in correspondence to produce a diagnostic about the quality of the current warping parameters); and a "Correctness" flag which is TRUE when the last run of the diagnosis and adjustment process that has reached the computation of vertical misalignment has also validated the warping parameters of the image processing pipeline—for example, when $\mu(\Theta)$ or $\mu(\Theta_0)$ have been found to be small enough.

The controlling process may also include parameters $T_r$, $T_d$, and $T_a$, which are the time delays between runs of the diagnosis and adjustment process when, respectively:

the warping epipolar geometry is found to be correct;
 when a diagnostic cannot be reached; and
 when warping parameters are still being adjusted.

These parameters may be set based on, amongst other factors: knowledge of the risk of occurrence of changes in the epipolar geometry; the consequences of not swiftly detecting or adjusting such a change; and the resources available.

In the flowchart of FIG. 13, the diagnosis and adjustment process may, for example, use a truncated numerical optimization method in the search for warping parameters. As a result, the execution of this search in the flowchart may only consume limited computational resources. As a consequence, the flowchart describes a process that may be adapted to run on a system with limited computational resources.

The process may begin at 1305, according to the illustrated embodiment. Here, in the diagnosis and adjustment process, the starting point may be initialized to the set of warping parameters $\Theta_0$. At 1310, the diagnosis and adjustment process may be run. At 1315, a determination may be made as to whether diagnosis is feasible, if not, then the diagnostic flag may be set to FALSE at 1320, and the process may wait for an interval of $T_d$ seconds at 1325 before returning to 1310.

If diagnosis is determined to be feasible at 1315, then at 1330, a determination may be made as to whether $\mu(\Theta_0)$ is sufficiently small. If so, then at 1335 correctness and diagnostic flags may be set to TRUE, and the process may wait for an interval of $T_r$ seconds at 1340 before returning to 1310.

If it is determined at 1330 that $\mu(\Theta_0)$ is not sufficiently small, then at 1345, a determination may be made as to whether $\mu(\Theta)$ is sufficiently small. If so, then at 1350, the warping parameters may be set to $\Theta$. At 1335, the correctness and diagnostic flags may be set to TRUE, and the process may wait for an interval of $T_r$ seconds at 1340 before returning to 1310.

If it is determined at 1345 that $\mu(\Theta)$ is not sufficiently small, then at 1355 a determination may be made as to whether $\mu(\Theta)$ is less than $\mu(\Theta_0)$. If not, then at 1370, the correctness flag may be set to FALSE and the diagnostic flag may be set to TRUE. The process may then wait for an interval of $T_a$ seconds at 1380 before returning to 1310. If, at 1355, it is determined that $\mu(\Theta)$ is less than $\mu(\Theta_0)$, then at 1360, the start point may be set to the warping parameters $\Theta$. At 1370, the correctness flag may be set to FALSE and the diagnostic flag may be set to TRUE. The process may then wait for an interval of $T_a$ seconds at 1380 before returning to 1310.

In a variant of FIG. 13, the setting of the start point to $\Theta$ in the diagnosis and adjustment process may also perform the setting of the warping parameters to $\Theta$ in the image processing pipeline. FIG. 14 illustrates shows a time-chart of one possible operation of a system that implements the flowchart of FIG. 13, according to an embodiment. At time T0, it was not possible to perform the diagnostic for example because a camera was temporarily obstructed. As a consequence, as shown in FIG. 14, the diagnostic flag was cleared at T0. At all other time in this figure, the diagnostic was properly performed, so the diagnostic flag was set.

At a later time, between T1 and T1+$T_r$, an incident occurred—for example a camera may have been subject to strong shock or vibration and its optical properties changed, so that the warping parameters were not appropriate anymore. The diagnostic and adjustment process, started at T1+$T_r$ detected the misfit and found improved parameters $\Theta$, but they were not good enough to meet the requirement "$\mu(\Theta)$ is small enough", so the correctness flag was cleared. The improved warping parameters were nevertheless applied to the pipeline. At T1+$T_r$+$T_a$, the diagnostic and adjustment process was run again and obtained parameters that were good enough, so the correctness flag was set. In this system, one could call "failure recovery" the result of the diagnostic and adjustment process.

In this example, the time intervals $T_d$ (diagnostic) and $T_a$ (adjustment) are smaller than $T_r$ (regular runtime interval), allowing the diagnostic to be re-run early if it could not be run in the past, and allowing warping parameters to be adjusted quickly.

FIG. 15 shows another possible time-chart of a system that performs run-time adjustment of warping parameters, according to an embodiment. In this example, the system includes cameras whose optical properties are subject to drift. If a significant amount of drift occurs, then the warping parameters may not be appropriate anymore and may require readjustment. In FIG. 15, readjustment occurs at times T0 and T2. In this system, the action of the diagnostic and adjustment process could be viewed as "parameter tracking".

In an embodiment, some or all of the processing described herein may be implemented as software, firmware, or hardware, or any combination thereof. Examples of hardware elements may include processors, microprocessors, microcontrollers, circuits, circuit elements (e.g., transistors, resistors, capacitors, inductors, and so forth), discrete and/or integrated circa logic, application specific integrated circuits (ASIC), programmable logic devices (PLD), digital signal processors (DSP), field programmable gate array (FPGA), logic gates, registers, semiconductor device, chips, microchips, chip sets, and may be implemented as part of a domain-specific integrated circuit package, or a combination of integrated circuit packages. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Figure 16:
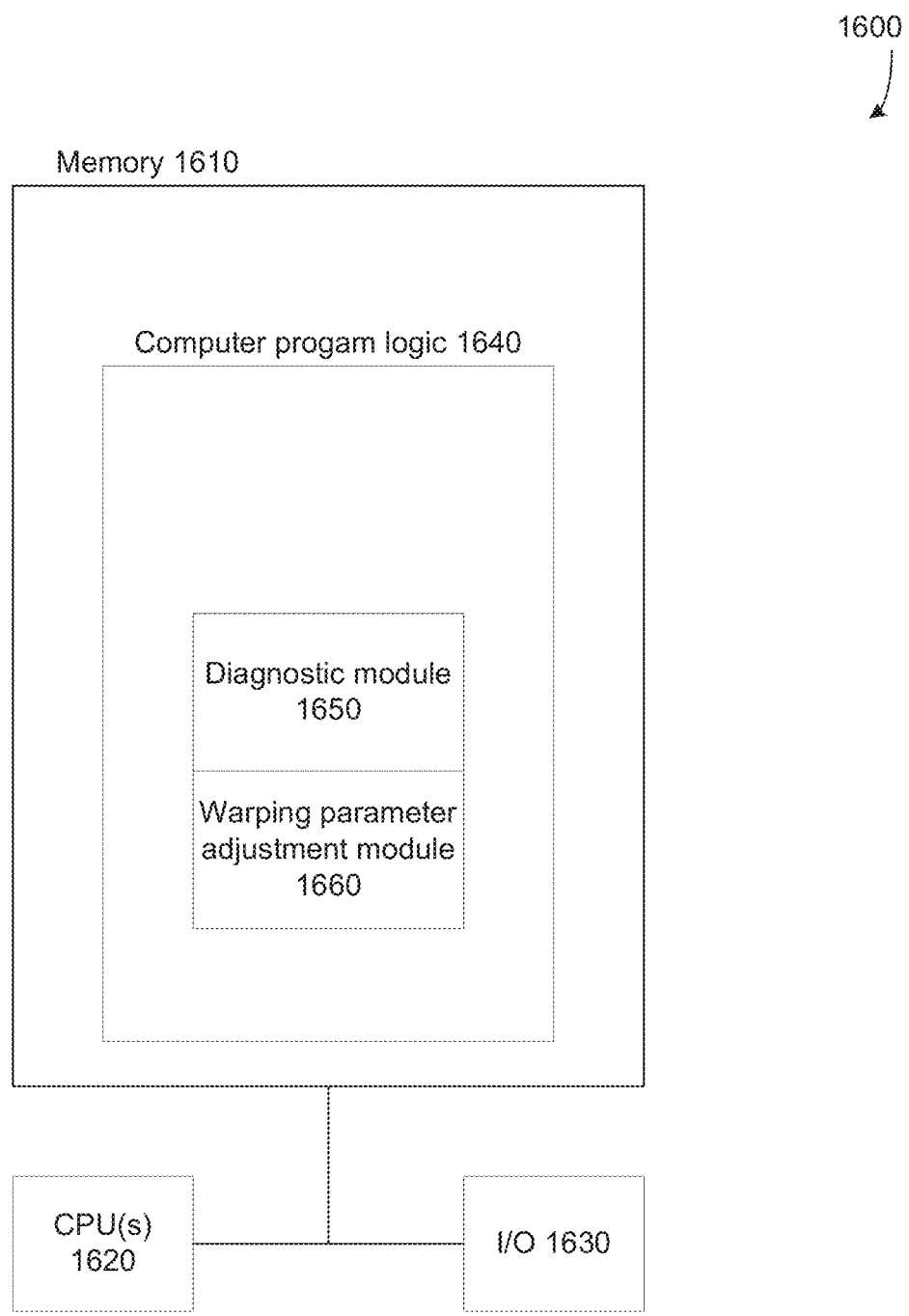
FIG. 16 is a block diagram illustrating a software embodiment of the system described herein.

A software or firmware embodiment is illustrated in the context of a computing system 1600 in FIG. 16. System 1600 may include one or more central processing unit(s) (CPU) 1620 and a body of memory 1610 that may include one or more transitory and/or non-transitory computer readable media that may store computer program logic 1640 and data received or generated during the processing described above. Such data may include but is not limited to raw and rectified images, indications of a need for adjustment of warping parameters, new warping parameters, diagnostic outcomes, and adjustment outcomes, for example. The body of memory 1610 may be implemented as one or more devices including a read-only memory (ROM) or random access memory (RAM) device, for example, or a combination thereof. CPU 1620 and memory 1610 may be in communication using any of several technologies known to one of ordinary skill in the art, such as a bus or a point-to-point interconnect. Computer program logic 1640 contained in memory 1610 may be read and executed by CPU 1620. In an embodiment, one or more I/O ports and/or I/O devices, shown collectively as I/O 1630, may also be connected to CPU 1620 and memory 1610. In an embodiment, I/O 1630 may include one or more input devices such as the imagers of FIGS. 3a, 3b, 8, and 13 for example, or other devices.

In the embodiment of FIG. 16, computer program logic 1640 may include a module 1650 responsible for diagnosing whether adjustment of warping parameters is necessary. Examples of such logic are described above and illustrated in the embodiments of FIGS. 4-7. Computer program logic 1640 may also include a module 1660 responsible for adjustment of warping parameters. Examples of such logic are described above and illustrated in the embodiments of FIGS. 9-12.

Figure 17:
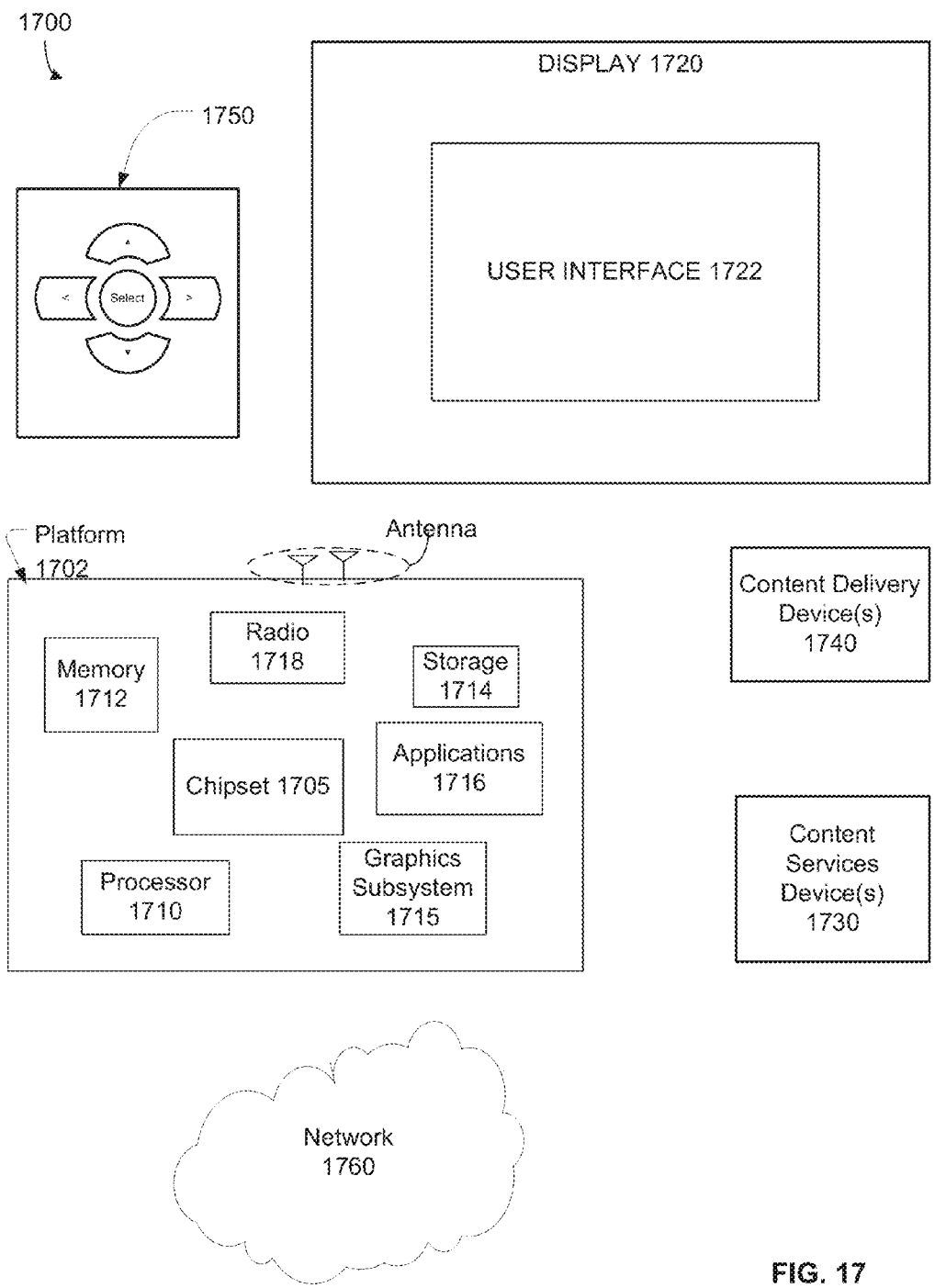
FIG. 17 illustrates an information system in which an embodiment may be implemented.

The systems, methods, and computer program products described above may be a part of a larger information system. FIG. 17 illustrates such an embodiment, as a system 1700. In embodiments, system 1700 may be a media system although system 1700 is not limited to this context. For example, system 1700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, smart watch or smart television), mobile Internet device (MID), messaging device, data communication device, and so forth. An image with an aligned warped depth map, generated as described above, may be provided to such a system for user access or for further processing by hardware or software executing in system 1700, for example.

In embodiments, system 1700 comprises a platform 1702 coupled to a display 1720. Platform 1702 may receive content from a content device such as content services device(s) 1730 or content delivery device(s) 1740 or other similar content sources. A navigation controller 1750 comprising one or more navigation features may be used to interact with, for example, platform 1702 and/or display 1720. Each of these components is described in more detail below.

In embodiments, platform 1702 may comprise any combination of a chipset 1705, processor 1710, memory 1712, storage 1714, graphics subsystem 1715, applications 1716 and/or radio 1718. Chipset 1705 may provide intercommunication among processor 1710, memory 1712, storage 1714, graphics subsystem 1715, applications 1716 and/or radio 1718. For example, chipset 1705 may include a storage adapter (not depicted) capable of providing intercommunication with storage 1714.

Processor 1710 may be implemented as Complex Instruction Set Computer (CISC) or Reduced instruction Set Computer (RISC) processors, x86 instruction set compatible processors, multi-core, or any other microprocessor or central processing unit (CPU), in embodiments, processor 1710 may comprise dual-core processor(s), dual-core mobile processor(s), and so forth.

Memory 1712 may be implemented as a volatile memory device such as, but not limited to, a Random Access Memory (RAM), Dynamic Random Access Memory (DRAM), or Static RAM (SRAM).

Storage 1714 may be implemented as a non-volatile storage device such as, but not limited to, a magnetic disk drive, optical disk drive, tape drive, an internal storage device, an attached storage device, flash memory, battery hacked-up SDRAM (synchronous DRAM), and/or a network accessible storage device, in embodiments, storage 1714 may comprise technology to increase the storage performance enhanced protection for valuable digital media when multiple hard drives are included, for example.

Graphics subsystem 1715 may perform processing of images such as still or video for display. Graphics subsystem 1715 may be a graphics processing unit (GPU) or a visual processing unit (VPU), for example. An analog or digital interface may be used to communicatively couple graphics subsystem 1715 and display 1720. For example, the interface may be any of a High-Definition Multimedia Interface, DisplayPort, wireless HDMI, and/or wireless HD compliant techniques. Graphics subsystem 1715 could be integrated into processor 1710 or chipset 1705. Graphics subsystem 1715 could be a stand-alone card communicatively coupled to chipset 1705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 1718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 1718 may operate in accordance with one or more applicable standards in any version.

In embodiments, display 1720 may comprise any television type monitor or display configured to display images such as graphics processed by the processing units discussed above. Display 1720 may comprise, for example, a computer display screen, touch screen display, video monitor, television-like device, and/or a television. Display 1720 may be digital and/or analog. In embodiments, display 1720 may be a holographic display. Also, display 1720 may be a transparent surface that may receive a visual projection. Such projections may convey various forms of information, images, and/or objects. For example, such projections may be a visual overlay for a mobile augmented reality (MAR) application. Under the control of one or more software applications 1716, platform 1702 may display user interface 1722 on display 1720.

In embodiments, content services device(s) 1730 may be hosted by any national, international and/or independent service and thus accessible to platform 1702 via the Internet, for example. Content services device(s) 1730 may be coupled to platform 1702 and/or to display 1720. Platform 1702 and/or content services device(s) 1730 may be coupled to a network 1760 to communicate (e.g., send and/or receive) media information to and from network 1760. Content delivery device(s) 1740 also may be coupled to platform 1702 and/or to display 1720.

In embodiments, content services device(s) 1730 may comprise a cable television box, personal computer, network, telephone, Internet enabled devices or appliance capable of delivering digital information and/or content, and any other similar device capable of unidirectionally or bidirectionally communicating content between content providers and platform 1702 and/display 1720, via network 1760 or directly. It will be appreciated that the content may be communicated unidirectionally and/or bidirectionally to and from any one of the components in system 1700 and a content provider via network 1760. Examples of content may include any media information including, for example, video, music, medical and gaming information, and so forth.

Content services device(s) 1730 receives content such as cable television programming including media information, digital information, and/or other content. Examples of content providers may include any cable or satellite television or radio or Internet content providers. The provided examples are not meant to limit embodiments of the invention.

In embodiments, platform 1702 may receive control signals from navigation controller 1750 having one or more navigation features. The navigation features of controller 1750 may be used to interact with user interface 1722, for example. In embodiments, navigation controller 1750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1750 may be echoed on a display (e.g., display 1720) by movements of a pointer, cursor, focus ring, or other visual indicators displayed on the display. For example, under the control of software applications 1716, the navigation features located on navigation controller 1750 may be mapped to virtual navigation features displayed on user interface 1722, for example. In embodiments, controller 1750 may not be a separate component but integrated into platform 1702 and/or display 1720. Embodiments, however, are not limited to the elements or in the context shown or described herein.

In embodiments, drivers (not shown) may comprise technology to enable users to instantly turn on and off platform 1702 like a television with the touch of a button after initial boot-up, when enabled, for example. Program logic may allow platform 1702 to stream content to media adaptors or other content services device(s) 1730 or content delivery device(s) 1740 when the platform is turned "off." in addition, chip set 1705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 1700 may be integrated. For example, platform 1702 and content services device(s) 1730 may be integrated, or platform 1702 and content delivery device(s) 1740 may be integrated, or platform 1702, content services device(s) 1730, and content delivery device(s) 1740 may be integrated, for example. In various embodiments, platform 1702 and display 1720 may be an integrated unit. Display 1720 and content service device(s) 1730 may be integrated, or display 1720 and content delivery device(s) 1740 may be integrated, for example. These examples are not meant to limit the invention.

In various embodiments, system 1700 may be implemented as a wireless system, a wired system, or a combination of both. When implemented as a wireless system, system 1700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 17.

As described above, system 1700 may be embodied in varying physical styles or form factors. FIG. 16 illustrates embodiments of a small form factor device 1600 in which system 1700 may be embodied. In embodiments, for example, device 1600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, smart watch or smart television), mobile internet device (MID), messaging device, data communication device, and so forth.

Examples of a mobile computing device also may include computers that are arranged to be worn by a person. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 18:
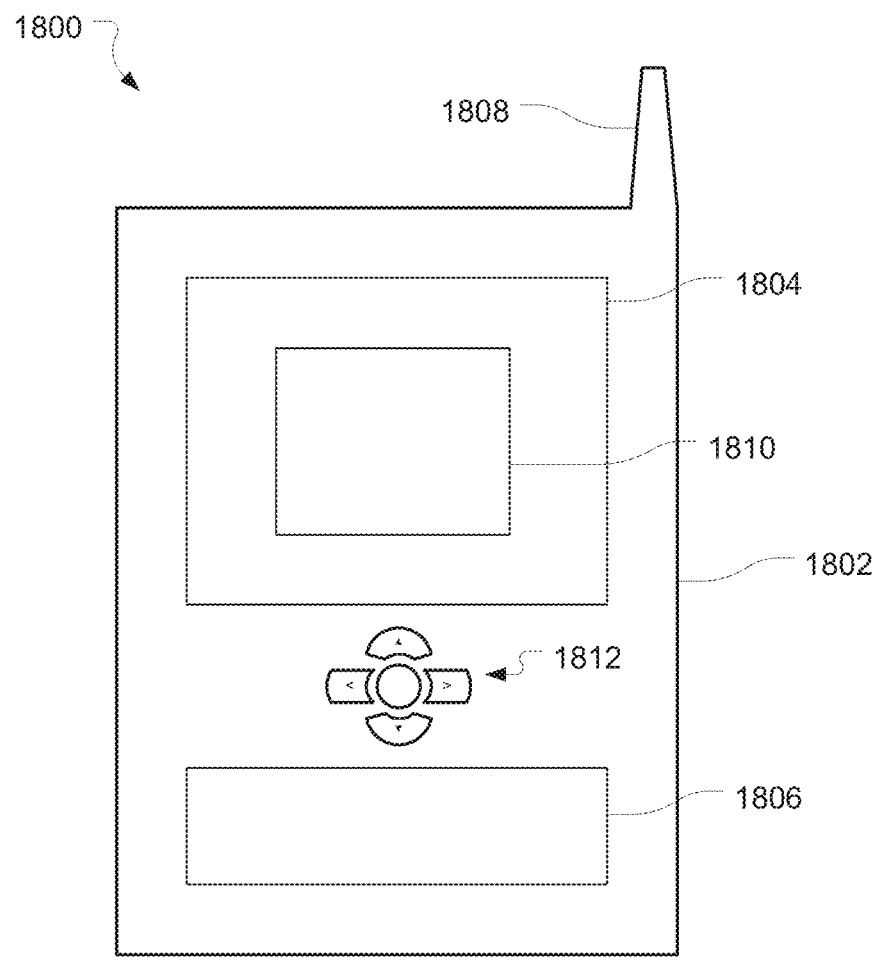
FIG. 18 illustrates a mobile information device in which an embodiment may be implemented.

As shown in FIG. 18, device 1800 may comprise a housing 1802, a display 1804, an input/output (I/O) device 1806, and an antenna 1808. Device 1800 also may comprise navigation features 1812. Display 1804 may comprise any suitable display unit for displaying information appropriate for a mobile computing device. Displayed information may include graphics processed by processing units, e.g., GPUs, I/O device 1806 may comprise any suitable I/O device for entering information into a mobile computing device. Examples for I/O device 1806 may include an alphanumeric keyboard, a numeric keypad, a touch pad, input keys, buttons, switches, rocker switches, microphones, speakers, voice recognition device and software, and so forth. Information also may be entered into device 1800 by way of microphone. Such information may be digitized by a voice recognition device. The embodiments are not limited in this context.

The following examples pertain to further embodiments.

Example 1 is a system for image processing, comprising an image processing pipeline that comprises two or more input imaging units rigidly positioned with respect to each other, each with a lens and an imager, wherein for each imaging unit the lens and imager are rigidly positioned with respect to each other and the lens has a focal length that is fixed; a warping module connected to each input imaging unit and configured to receive raw images from the connected input imaging units and to output a rectified image; and a diagnostic module configured to determine if current warping parameters used by the warping module allow the warping module to output images having predetermined geometric or optical properties.

In example 2, the image processing pipeline of example 1 further comprises: an adjustment module configured to adjust the warping parameters so that when adjusted warping parameters are used by the warping module, the image processing pipeline outputs images with the predetermined geometric or optical properties.

In example 3, said diagnostic module of example 2 comprises circuit logic configured to detect epipolar misalignment by comparing corresponding features in a pair of images originated by two respective input imaging units of the two or more input imaging units.

In example 4, said adjustment module of example 3 comprises: circuit logic configured to execute a feature-based matching process on the pair of images; and circuit logic configured to determine warping parameters that, when used in the warping modules connected to the two respective input imaging units, produce images in which epipolar lines occur on corresponding rows of the images.

In example 5, said diagnostic module of example 2 comprises: circuit logic configured to identify the locations of projections of 3D points with known geometric properties in a rectified image; circuit logic configured to use the projections to compute estimated positions of the 3D points; and circuit logic configured to determine whether the estimated positions agree with the geometric or optical properties.

In example 6, said adjustment module of example 5 comprises: circuit logic configured to identify, in a pair of images generated by two respective input imaging units of the two or more input imaging units, a set of respective pairs of estimated locations of projections of the 3D points; and circuit logic configured to determine warping parameters that, when used in a warping process, minimize discrepancy between the estimated locations and actual locations of the 3D points.

In example 7, said diagnostic module of example 2 comprises: circuit logic configured to determine a minimum number $N_0$ of corresponding features locations generated by a respective pair of input imaging units of the two or more input imaging units, at which correspondence would be found if warping parameters were correct; circuit logic configured to perform a dense correspondence process on input images and to produce a total count, N, of corresponding locations; and circuit logic configured to determine if $N \geq N_0$.

Example 8 is method of image processing, comprising: creating two or more raw images using two or more input imaging units rigidly positioned with respect to each other, each with a lens and an imager, wherein for each imaging unit the lens and imager are rigidly positioned with respect to each other and the lens has a focal length that is fixed; warping the raw images and outputting respective rectified images; and determining if current warping parameters used by said warping module result on warped images that have predetermined geometric or optical properties.

In example 9, the method of example 8 further comprises adjusting the warping parameters so that when adjusted warping parameters are used by said warping, the rectified images have the predetermined geometric or optical properties.

In example 10, said determining in example 9 comprises: detecting epipolar misalignment by comparing corresponding features in a pair of images originated by two respective input imaging units of the two or more input imaging units.

In example 11, said adjusting of the warping parameters in example 10 comprises: executing a feature-based matching process on the pair of images; and determining warping parameters that, when used in the warping modules connected to the two respective input imaging units, produce images in which epipolar lines occur on corresponding rows of the images.

In example 12, said determining in example 9 comprises: identifying locations of projections of 3D points with known geometric properties in a rectified image; using the projections to compute estimated positions of the 3D points; and determining whether the estimated positions agree with the geometric or optical properties.

In example 13, said adjusting of the warping parameters of example 12 comprises: identifying, in a pair of images generated by two respective input imaging units of the two or more input imaging units, a set of respective pairs of estimated locations of projections of the 3D points; and determining warping parameters that, when used in a warping process, minimize discrepancy between the estimated locations and actual locations of the 3D points.

In example 14, said determining in example 9 comprises: determining a minimum number $N_0$ of corresponding features locations generated by a respective pair of input imaging units of the two or more input imaging units, at which correspondence would be found if warping parameters were correct; performing a dense correspondence process on input images and to produce a total count N, of corresponding locations; and determining if $N \geq N_0$.

Example 15 is a computer program product for image processing, including at least one non-transitory computer readable medium having computer program logic stored therein, the computer program logic including: warping logic to cause a processor to warp raw images that are created by two or more respective input imaging units rigidly positioned with respect to each other, each input imaging unit with a lens and an imager, wherein for each imaging unit the lens and imager are rigidly positioned with respect to each other and the lens has a focal length that is fixed; and outputting respective rectified images; and diagnostic logic to cause the processor to determine if current warping parameters used by said warping logic result on warped images that have predetermined geometric or optical properties.

In example 16, the computer program product of example 15 further comprises: adjustment logic to cause the processor to adjust the warping parameters so that when adjusted warping parameters are used by said warping logic, the rectified images have the predetermined geometric or optical properties.

In example 17, said diagnostic logic of example 16 comprises: logic to cause the processor to detect epipolar misalignment by comparing corresponding features in a pair of images originated by two respective input imaging units of the two or more input imaging units.

In example 18, said adjustment logic of example 17 comprises: logic to cause the processor to execute a feature-based matching process on the pair of images; and logic to cause the processor to determine warping parameters that, when used in the warping modules connected to the two respective input imaging units, produce images in which epipolar lines occur on corresponding rows of the images.

In example 19, said diagnostic logic of example 16 comprises: logic to cause the processor to identify locations of projections of 3D points with known geometric properties in a rectified image; logic to cause the processor to use the projections to compute estimated positions of the 3D points; and logic to cause the processor to determine whether the estimated positions agree with the geometric or optical properties.

In example 20, said adjustment logic of example 19 comprises: logic to cause the processor to identify, in a pair of images generated by two respective input imaging units of the two or more input imaging units, a set of respective pairs of estimated locations of projections of the 3D points; and logic to cause the processor to determine warping parameters that, when used in a warping process, minimize discrepancy between the estimated locations and actual locations of the 3D points.

In example 21, said diagnostic logic of example 16 comprises: logic to cause the processor to determine a minimum number $N_0$ of corresponding features locations generated by a respective pair of input imaging units of the two or more input imaging units, at which correspondence would be found if warping parameters were correct; logic to cause the processor to perform a dense correspondence process on input images and to produce a total count, N, of corresponding locations; and logic to cause the processor to determine if $N \geq N_0$.

Example 22 is an apparatus for image processing, comprising an image processing pipeline that comprises two or more input imaging units rigidly positioned with respect to each other, each with a lens and an imager, wherein for each imaging unit the lens and imager are rigidly positioned with respect to each other and the lens has a focal length that is fixed; means for warping raw images received from input imaging units and outputting respective rectified images; and means for determining if current warping parameters used by the warping means allow the warping means to output images having predetermined geometric or optical properties.

In example 23, the image processing pipeline of example 22 further comprises: adjustment means for adjusting the warping parameters so that when adjusted warping parameters are used by the warping means, the image processing pipeline outputs images with the predetermined geometric or optical properties.

In example 24, said determining means of claim 23 comprises: means for detecting epipolar misalignment by comparing corresponding features in a pair of images originated by two respective input imaging units of the two or more input imaging units.

In example 25, said adjustment means of example 24 comprises: means for executing a feature-based matching process on the pair of images; and means for determining warping parameters that, when used by the warping means, produce images in which epipolar lines occur on corresponding rows of the images.

In example 26, said determining means of example 23 comprises: means for identifying the locations of projections of 3D points with known geometric properties in a rectified image; means for using the projections to compute estimated positions of the 3D points; and means for determining whether the estimated positions agree with the geometric or optical properties.

In example 27, said adjustment means of example 26 comprises: means for identifying, in a pair of images generated by two respective input imaging units of the two or more input imaging units, a set of respective pairs of estimated locations of projections of the 3D points; and means for determining warping parameters that, when used in a warping process, minimize discrepancy between the estimated locations and actual locations of the 3D points.

In example 28, said determining means of example 23 comprises: means for determining a minimum number $N_0$ of corresponding features locations generated by a respective pair of input imaging units of the two or more input imaging units, at which correspondence would be found if warping parameters were correct; means for performing a dense correspondence process on input images and to produce a total count, N, of corresponding locations; and means for determining if $N \geq N_0$.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed. Moreover, while various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A system for image processing, comprising:
    an image processing pipeline that comprises
    two or more input imaging units rigidly positioned with respect to each other, each with a lens and an imager, wherein for each imaging unit the lens and imager are rigidly positioned with respect to each other and the lens has a focal length that is fixed;
    a warping module connected to each input imaging unit and configured to receive raw images from the connected input imaging units and to apply warping parameters to output a rectified image; and
    a diagnostic module configured to:
        determine a number of pixels in a first rectified image associated with a first of the input imaging units and identified by a dense stereo correspondence algorithm as matching pixels in a second rectified image associated with a second of the input imaging units;
        compare the number of pixels identified as matching with a predetermined threshold number of pixels for which correspondence is estimated to be found in response to the warping parameters being correct; and
        detect epipolar misalignment in response to the number of pixels identified as matching failing to satisfy the predetermined threshold; and
    an adjustment module configured to adjust the warping parameters in response to detection of the epipolar misalignment.

2. The system of claim 1, wherein the adjustment module is configured to adjust the warping parameters so that when adjusted warping parameters are used by the warping module, the image processing pipeline outputs images with the predetermined geometric or optical properties.

3. The system of claim 2, wherein said diagnostic module further comprises:
    circuit logic configured to:
        compare corresponding features in the first and second rectified images; and
        detect the epipolar misalignment by compounding an output of the corresponding feature comparison and the comparison of the number of pixels identified as matching to the predetermined threshold.

4. The system of claim 3, wherein said adjustment module comprises:
    circuit logic configured to execute a feature-based matching process on the first and second rectified images; and
    circuit logic configured to perform an optimization parameters to minimize a measure of vertical misalignment, the optimization performed over a search space restricted to include projective transformations AR where R is a rotation matrix and A is a projective transformation matrix A associated with a prior warping parameter value.

5. The system of claim 2, wherein said diagnostic module further comprises:
    circuit logic configured to identify the locations of projections of 3D points with known geometric properties in a rectified image;
    circuit logic configured to use the projections to compute estimated positions of the 3D points; and
    circuit logic configured to determine whether the estimated positions agree with the geometric or optical properties.

6. The system of claim 5, wherein said adjustment module comprises:
    circuit logic configured to identify, in the first and second rectified images, a set of respective pairs of estimated locations of projections of the 3D points; and
    circuit logic configured to determine warping parameters that, when used in a warping process, minimize discrepancy between the estimated locations and actual locations of the 3D points.

7. A method of image processing, comprising:
    creating two or more raw images using two or more input imaging units rigidly positioned with respect to each other, each with a lens and an imager, wherein for each imaging unit the lens and imager are rigidly positioned with respect to each other and the lens has a focal length that is fixed;
    warping the raw images with warping parameters and outputting respective rectified images; and
    determining a number of pixels in a first rectified image associated with a first of the input imaging units and identified by a dense stereo correspondence algorithm as matching pixels in a second rectified image associated with a second of the input imaging units;
    comparing the number of pixels identified as matching with a predetermined threshold number of pixels for which correspondence is estimated to be found in response to the warping parameters being correct; and
    detecting epipolar misalignment in response to the number of pixels identified as matching failing to satisfy the predetermined threshold; and
    adjusting the warping parameters in response to the detecting of the epipolar misalignment.

8. The method of claim 7, further comprising:
    adjusting the warping parameters so that when adjusted warping parameters are used by said warping, the rectified images have a predetermined geometric or optical properties.

9. The method of claim 8, wherein said determining further comprises:
    comparing corresponding features in the first and second rectified images; and
    wherein the detecting further comprises compounding an output of the corresponding feature comparison and the comparison of the number of pixels identified as matching to the predetermined threshold.

10. The method of claim 9, wherein said adjusting of the warping parameters comprises:
executing a feature-based matching process on the first and second rectified images; and
performing an optimization of warping parameters to minimize a measure of vertical misalignment, the optimization performed over a search space restricted to include projective transformations AR where R is a rotation matrix and A is a projective transformation matrix A associated with a prior warping parameter value.

11. The method of claim 8, wherein said determining further comprises:
identifying locations of projections of 3D points with known geometric properties in a rectified image;
using the projections to compute estimated positions of the 3D points; and
determining whether the estimated positions agree with the geometric or optical properties.

12. The method of claim 11, wherein said adjusting of the warping parameters comprises:
identifying, in the first and second rectified images, a set of respective pairs of estimated locations of projections of the 3D points; and
determining warping parameters that, when used in a warping process, minimize discrepancy between the estimated locations and actual locations of the 3D points.

13. A non-transitory computer-readable storage medium having computer program instructions stored therein, that when executed on a processor cause the processor to perform a method comprising:
creating two or more raw images using two or more input imaging units rigidly positioned with respect to each other, each with a lens and an imager, wherein for each imaging unit the lens and imager are rigidly positioned with respect to each other and the lens has a focal length that is fixed;
warping the raw images with warping parameters and outputting respective rectified images; and
determining a number of pixels in a first rectified image associated with a first of the input imaging units and identified by a dense stereo correspondence algorithm as matching pixels in a second rectified image associated with a second of the input imaging units;
comparing the number of pixels identified as matching with a predetermined threshold number of pixels for which correspondence is estimated to be found in response to the warping parameters being correct; and
detecting epipolar misalignment in response to the number of pixels identified as matching failing to satisfy the predetermined threshold; and
adjusting the warping parameters in response to the detecting of the epipolar misalignment.

14. The non-transitory computer-readable storage medium of claim 13, further comprising instructions to cause the processor to perform the method further comprising:
adjusting the warping parameters so that when adjusted warping parameters are used by said warping, the rectified images have a predetermined geometric or optical properties.

15. The non-transitory computer-readable storage medium of claim 14, wherein said instructions cause the processor to perform the method further comprising:
comparing corresponding features in the first and second rectified images; and wherein the detecting further comprises compounding an output of the corresponding feature comparison and the comparison of the number of pixels identified as matching to the predetermined threshold.

16. The non-transitory computer-readable storage medium of claim 15, wherein said instructions cause the processor to perform the method further comprising:
executing a feature-based matching process on the first and second rectified images; and
performing an optimization of warping parameters to minimize a measure of vertical misalignment, the optimization performed over a search space restricted to include projective transformations AR where R is a rotation matrix and A is a projective transformation matrix A associated with a prior warping parameter value.

17. The non-transitory computer-readable storage medium of claim 14, wherein said instructions cause the processor to perform the method further comprising:
identifying locations of projections of 3D points with known geometric properties in a rectified image;
using the projections to compute estimated positions of the 3D points; and
determining whether the estimated positions agree with the geometric or optical properties.

18. The non-transitory computer-readable storage medium of claim 17, wherein said instructions cause the processor to perform the method further comprising:
identifying, in the first and second rectified images, a set of respective pairs of estimated locations of projections of the 3D points; and
determining warping parameters that, when used in a warping process, minimize discrepancy between the estimated locations and actual locations of the 3D points.

* * * * *